United States Patent [19]
Steeber et al.

[11] Patent Number: 6,152,291
[45] Date of Patent: Nov. 28, 2000

[54] APPARATUS FOR CONTROLLING THE FLOW OF ARTICLES

[75] Inventors: Dorian F. Steeber, Anderson; Olivier P. Duterte, Greer, both of S.C.

[73] Assignee: Hartness International, Greenville, S.C.

[21] Appl. No.: 09/036,745

[22] Filed: Mar. 9, 1998

[51] Int. Cl.[7] .................................................. B65G 17/28
[52] U.S. Cl. ............................................. 198/594; 198/812
[58] Field of Search ................................ 198/347.1, 594, 198/812

[56] References Cited

U.S. PATENT DOCUMENTS

| | | |
|---|---|---|
| 4,018,325 | 4/1977 | Rejsa . |
| 4,413,724 | 11/1983 | Fellner . |
| 4,469,219 | 9/1984 | Cosse' . |
| 4,513,858 | 4/1985 | Fellner . |
| 4,549,647 | 10/1985 | Cosse' . |
| 4,989,718 | 2/1991 | Steeber . |
| 5,722,655 | 3/1998 | Reist ................................... 198/812 X |
| 5,772,005 | 6/1998 | Hansch .................................... 198/594 |

FOREIGN PATENT DOCUMENTS

| | | | |
|---|---|---|---|
| 2618905 | 11/1977 | Germany ............................... 198/594 |

OTHER PUBLICATIONS

Pending U.S. Patent Application Serial No. 09/235,888, filed Jan. 22, 1999, entitled "Apparatus for Controlling the Flow of Articles".

*Primary Examiner*—James R. Bidwell
*Attorney, Agent, or Firm*—Dority & Manning, P.A.

[57] ABSTRACT

An apparatus for controlling the flow of articles from an upstream delivery station to a downstream receiving station and for temporarily storing the articles on a pair of parallel conveyors with a substantial run of the conveyors being in a vertically extending spiral made up of an incoming conveyor and an outgoing conveyor. A movable transport member is used for transferring the articles from the incoming conveyor and the outgoing conveyor at a rate dependent upon the relative speed of the two conveyors.

19 Claims, 16 Drawing Sheets

APPARATUS FOR CONTROLLING THE FLOW OF ARTICLES

BACKGROUND OF THE INVENTION

The present invention relates to an apparatus for controlling the flow of articles from an upstream delivery station to a downstream receiving station; and more particularly to an apparatus wherein articles can be accumulated between an upstream delivery station and a downstream receiving station, and fed to the downstream receiving station in a first in first out (FIFO) sequence.

Heretofore, accumulators have been utilized between an upstream delivery station and a downstream receiving station to accumulate articles when the capacity of the downstream receiving station is either shut down or run at a speed wherein it cannot handle the number of articles being fed by the upstream delivery station. One particular accumulator is disclosed in U.S. Pat. No. 4,018,325. One problem with such accumulators is that the last article fed into the accumulator is the first article fed out of the accumulator and, as a result, it is difficult to keep track of the batch from which a particular article came from, and the sequence in which the articles are fed from the upstream delivery station.

Attempts have been made to produce accumulators wherein the first in is the first out article as disclosed in U.S. Pat. No. 4,513,858.

The present invention is particularly adapted for use wherein an upstream delivery station may be a filling station for placing contents into a package and feeding them to a downstream receiving station wherein the package is placed in boxes. It of course can be used in many different industries wherein there is a need to control the rate of flow of articles between an upstream delivery station and a downstream receiving station.

SUMMARY OF THE INVENTION

One of the objects of the present invention is to provide an apparatus for controlling the flow of articles from an upstream delivery station to a downstream receiving station and for temporarily storing the articles there between and feeding the first article stored therein out first (FIFO).

Another important object of the present invention is to provide an apparatus for accumulating articles wherein there is a minimum of contact between the articles in the accumulator. This minimizes damage to labels and printed material carried on the outside of the article or package or to the article itself.

Still another important object of the present invention is to provide an article storage accumulator which permits a large number of articles to be stored in a relatively small amount of floor space, thus reducing the distance between an upstream delivery station and a downstream receiving station. Still another object of the present invention is to provide an accumulator which operates automatically responsive to the requirements of a downstream receiving station to store articles temporarily prior to delivering the articles to the downstream receiving station in a first in first out (FIFO) sequence.

It is another object of the present invention to decrease the potential for damage or breakage as well as jamming or wedging of items to be accumulated because of the manner in which the articles are stored on a moving conveyor.

It is another important object of the present invention to provide an effective and reliable accumulator which can be readily modified for accumulating articles of different sizes and configurations.

Still another important object of the present invention is to provide an apparatus for accumulating articles in a vertically stacked arrangement on a moving conveyor system constructed in the form of a vertically extending spiral.

Still another important object of the present invention is to provide an accumulator wherein articles are temporarily stored on a moving conveyor which permits the loading and unloading of the moving conveyor responsive to the capacity of a downstream receiving station.

Another important object of the present invention is to provide an accumulator which utilizes an infeed and outfeed conveyor for temporarily storing articles at a rate depending on the relative speed of travel of the infeed conveyor and the outfeed conveyor.

Another object of the present invention is to provide an effective and reliable apparatus for controlling the flow of articles from an upstream delivery station to an downstream receiving station at a relatively high speed.

The above objects are accomplished by an apparatus that controls the flow of articles being transported on a main conveyor from an upstream delivery station to a downstream receiving station according to the capacity of the downstream receiving station. The apparatus includes an endless infeed conveyor and endless outfeed conveyor. A support structure supports the infeed conveyor and the outfeed conveyor where a substantial portion of the run of the conveyors are parallel to each other providing a space therebetween. A track is carried by the support structure. The track extends along the parallel run of the infeed and outfeed conveyors. A transport member is carried by the track in the space provided between the infeed and outfeed conveyors for movement along the length of the infeed and outfeed conveyors.

An infeed drive mechanism drives the infeed conveyor in one direction, and an outfeed drive mechanism drives the outfeed conveyor in a second direction. A deflective plate or any other suitable mechanism is used for transferring the articles from a main conveyor onto the infeed conveyor. A rotatable member is carried by the transport member. There is a driving coupling provided between the infeed conveyor and the rotatable member through which the infeed conveyor rotates the rotatable member. There is also a driving coupling provided between the rotatable member and the outfeed conveyor for rotating the rotatable member and causing the transport member to move along the guide track in a direction depending upon the relative speed of travel of the infeed and outfeed conveyors. An article transfer member is carried by the transport member for transferring articles from the infeed conveyor to a position along the outfeed conveyor as the transport member moves along the guide track.

The accomplishment of the objects discussed above will become readily apparent from the following description of various embodiments of the present invention.

DETAILED DESCRIPTION OF THE PREFERRED EMBODIMENTS

Figure 1:
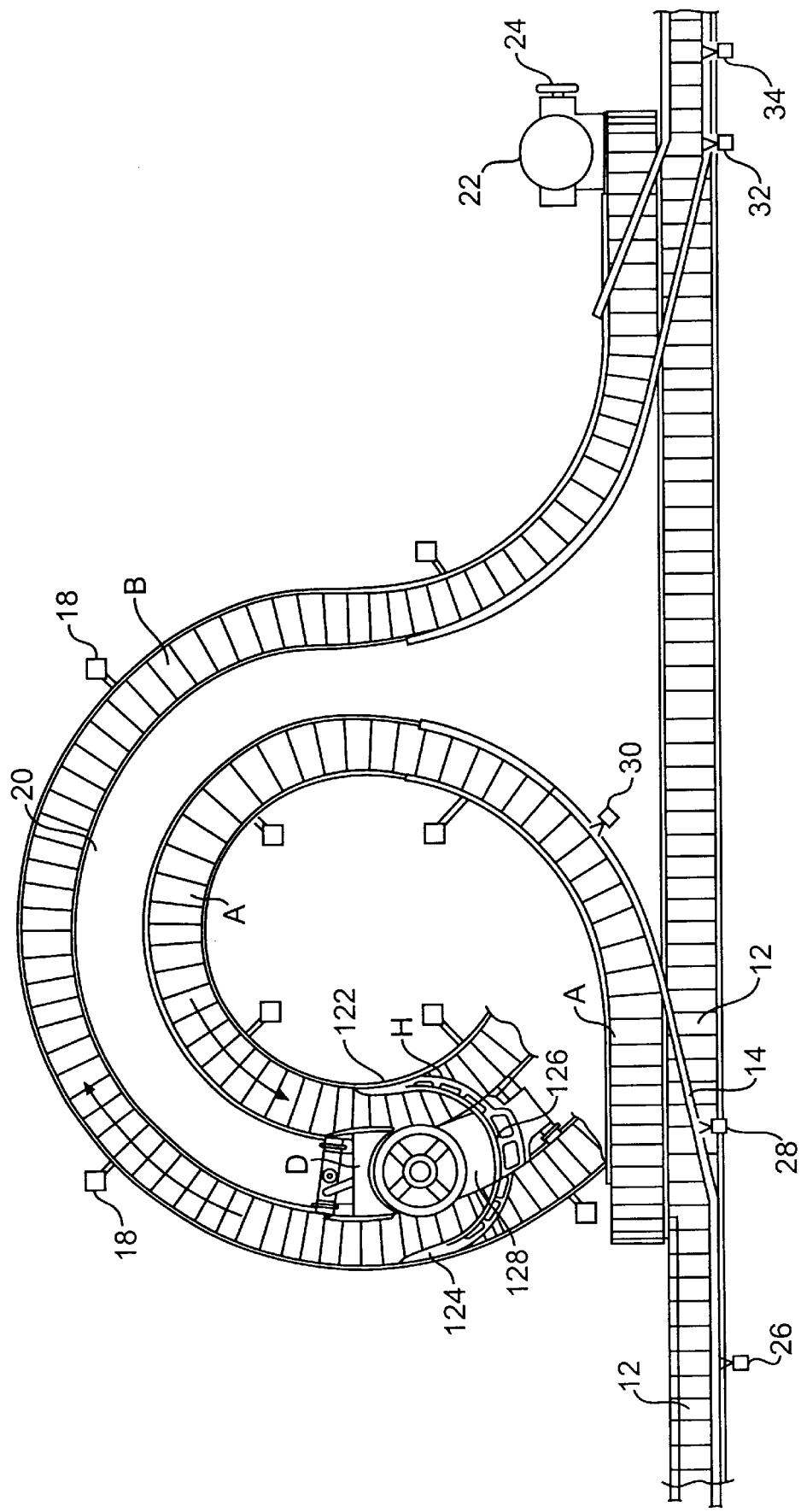
FIG. 1 is a plan view illustrating an apparatus for controlling the flow of articles in its simplest forms.

Referring to FIGS. 1, 2, 3 and 4 there is illustrated an apparatus for controlling the flow of articles 10 from an upstream delivery station (FIG. 4) to a downstream receiving station. The articles are being carried on a main conveyor 12 that is driven by any conventional conveyor drive mechanism for transporting the articles 10 from the upstream delivery station. The articles are feed along the main feed conveyor 12 until they reach a deflecting rail 14 wherein they are deflected off of the main conveyor 12 onto an infeed conveyor A. The infeed conveyor A is an endless conveyor and is driven by a variable speed motor 16.

An outfeed conveyor B is carried on a support structure. Only the vertical posts 18 are being shown for purposes of clarity. A substantial portion of the run of the infeed and outfeed conveyors A and B are parallel to each other providing a space 20 therebetween.

A transport member D rides on a track carried by the support structure that permits the transport member D to move backwards and forwards along the length of the infeed and outfeed conveyors A and B. The infeed drive mechanism 16 drives the infeed conveyor A in a first direction. An outfeed drive mechanism 22 drives the outfeed conveyor B in a second direction. A variable speed control 24 is operatively connected to the outfeed drive mechanism for varying the speed of the outfeed conveyor.

Figure 10:
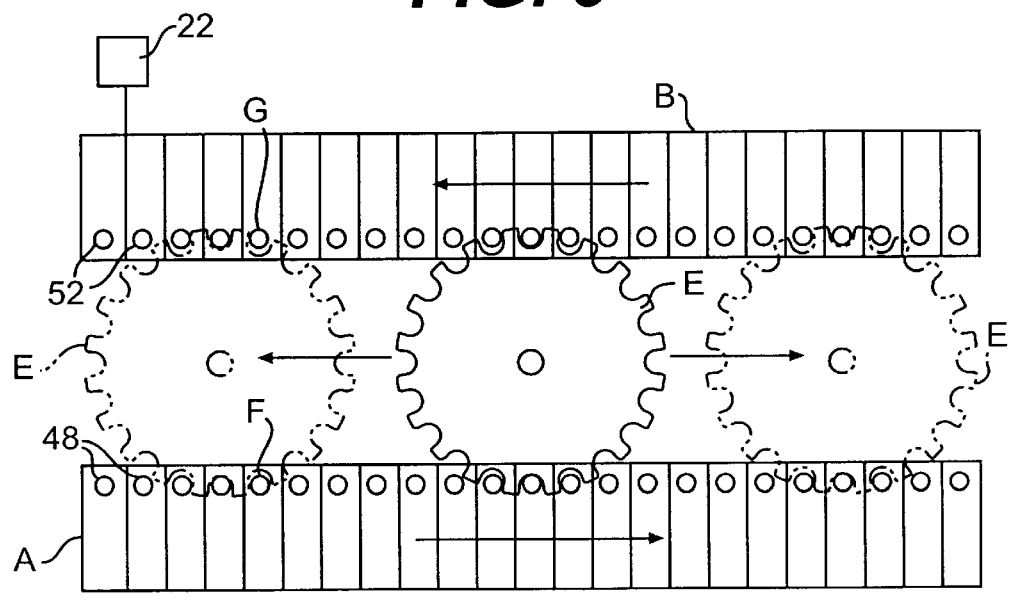
FIG. 10 is a schematic diagram illustrating the manner in which the transport member is moved between an infeed and outfeed conveyor.
Figure 11:
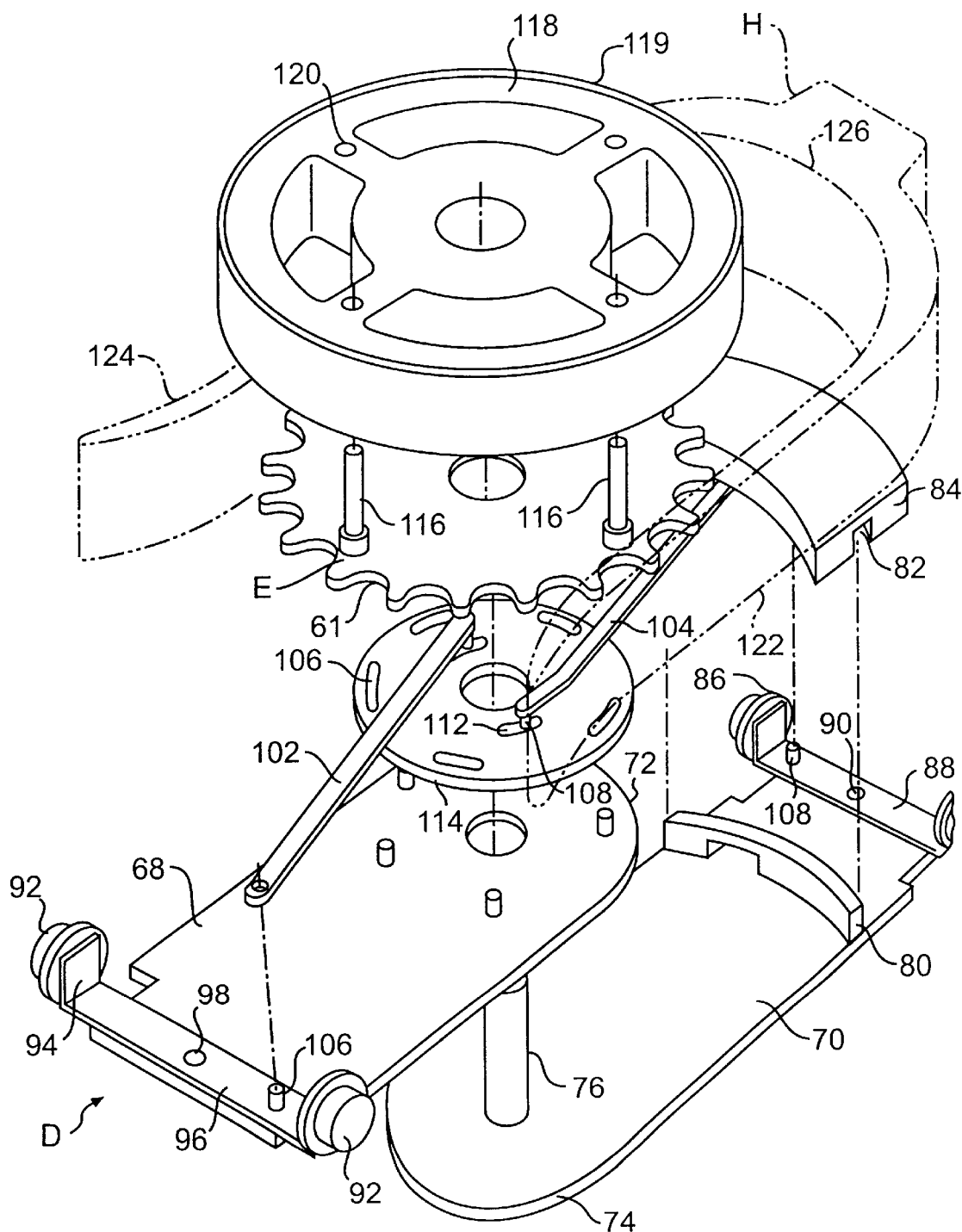
FIG. 11 is an exploded view of a transport member.
Figure 12:
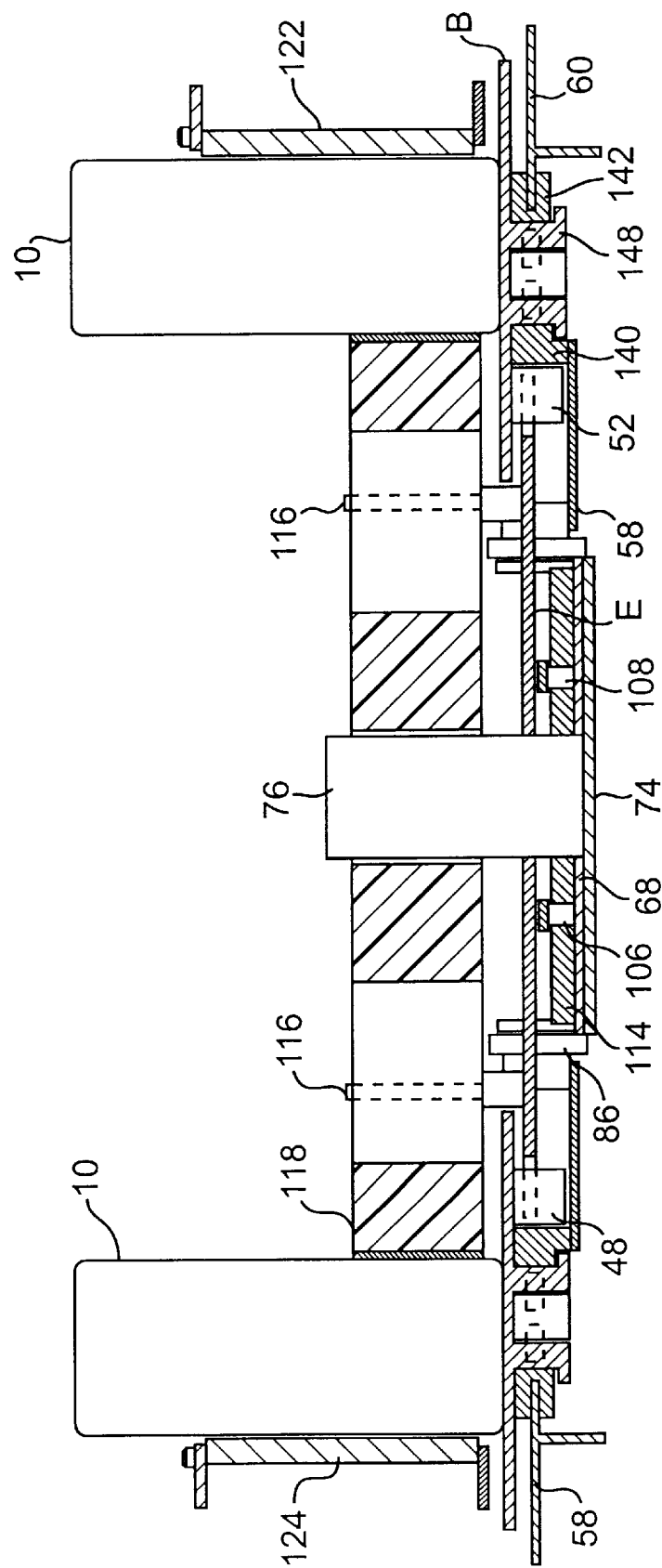
FIG. 12 is a cross-sectional view of the transfer member.

A rotatable member E see FIGS. 10 and 11 is carried by the transport member D. Drivers F are carried by the infeed conveyor A and engages the rotatable member E for rotating the rotatable member. Drivers G are carried by the outfeed conveyor B and engage the rotatable member E for rotating the rotatable member and causing said transport member D to move along a path parallel to the infeed conveyor A and the outfeed conveyor B, at a speed and direction depending on the relative speed of the infeed conveyor A and the outfeed conveyor B. An article transfer member H is carried by the transport member D for deflecting articles from the infeed conveyor A to the outfeed conveyor B.

Figure 2:
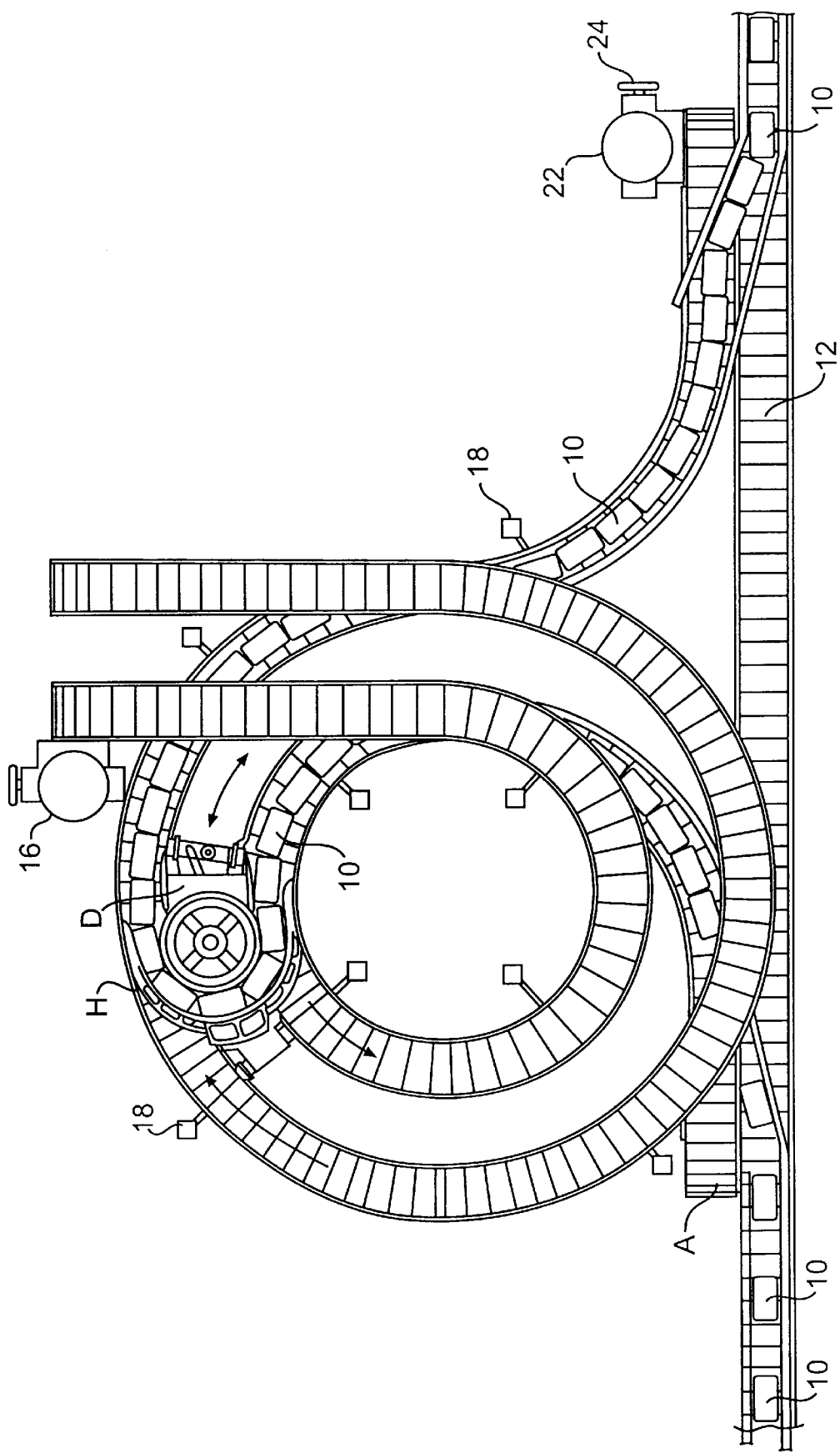
FIG. 2 is a plan view of the apparatus of FIG. 1 showing articles being loaded into the apparatus.
Figure 3:
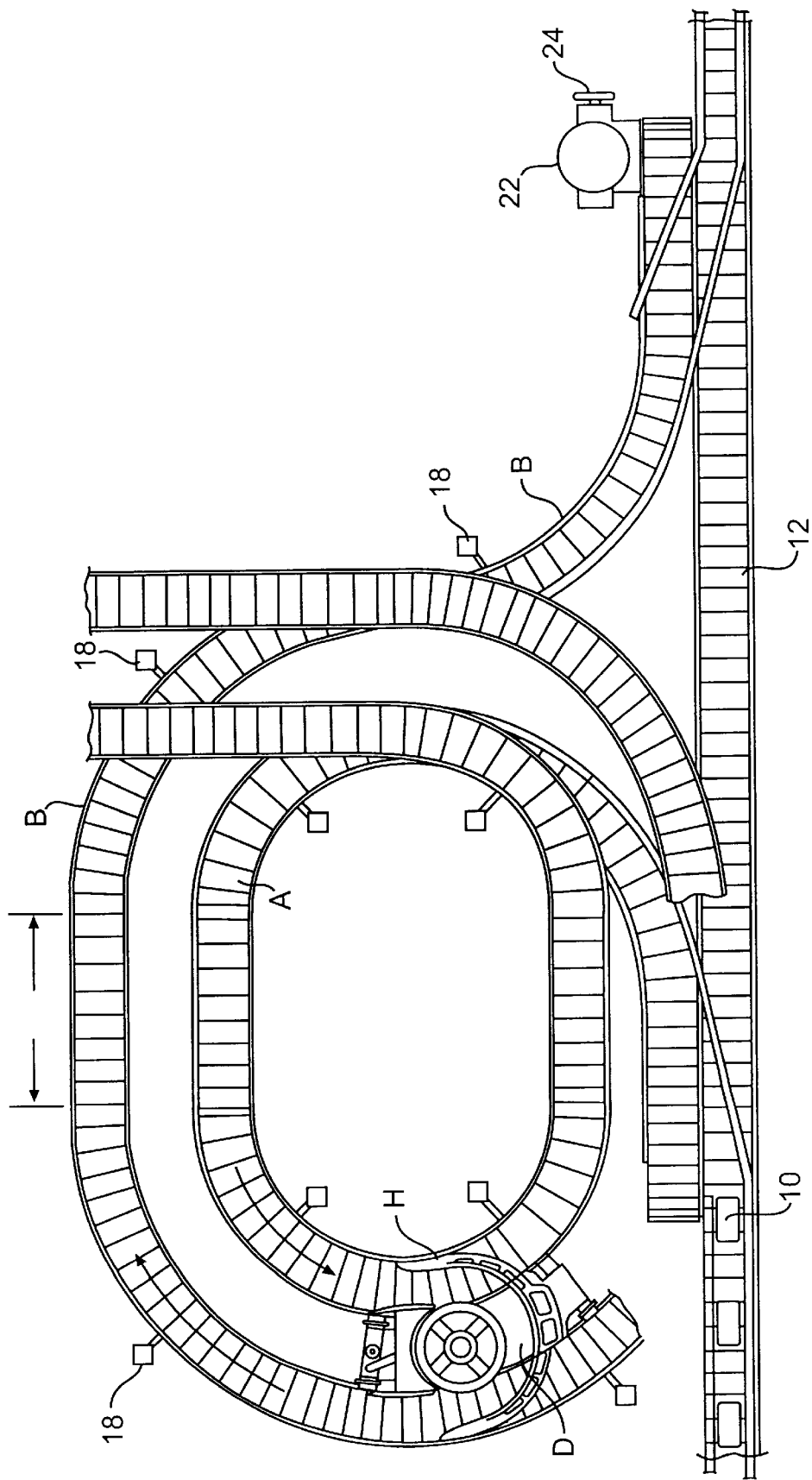
FIG. 3 is a plan view of a modified form of the invention.

The speed of the outfeed conveyor is controlled by the variable speed motor 22; and if the speed of the outfeed conveyor B is running slower than the speed of the infeed conveyor A then the transport member as shown in FIGS. 1, 2 and 3 is moved in the counter clockwise direction loading up the articles on the surfaces of the infeed conveyor and the outfeed conveyor B for temporarily storing the articles in the accumulator.

When the demand from the downstream receiving station increases, a signal is generated by condition responsive devices 32 and 34 positioned along side of the conveyor B. These devices will cause the speed of the outfeed conveyor B to increase and be greater than the speed of the infeed conveyor. When this occurs, the transport member D due to the driving connection between the infeed and outfeed conveyors A and B will move in a clockwise direction; and the number of articles stored on the infeed and outfeed conveyors A and B will be reduced and the first article that was stored is the first article delivered from the outfeed conveyor B. The driving connection between the transport member D and the infeed and outfeed conveyor A and B will be discussed in greater detail below.

Condition responsive devices are positioned along the conveyors for generating signals responsive to various conditions. For example, condition responsive device 26 is positioned adjacent to the main conveyor 12 for sensing a backup of articles on the main conveyor; and if such a condition occurs a signal is sent to a controller which causes the infeed conveyor A to shift to a higher speed. The condition responsive device 26 may be any suitable conventional sensor, but in one particular embodiment it is a photocell provided with a timer so that if the photocell is activated for a certain period of time by non movement of the article a signal is generated. The articles 10 carried on the main conveyor are spaced apart, and as long as the space is sensed between the articles in a given period of time then no signal is generated by the photocell to trigger an increase in speed of the infeed conveyor A. One suitable photocell is manufactured by Sick A.G. having a part number of WT4-2P135S10. Sick A.G. is located in Wldkirch, Germany. It is to be understood that any conventional suitable conditional responsive device could be used at any of the locations where one is required.

Another condition responsive device 28 is positioned along the main conveyor closely adjacent to the front end of the rail 14. It is provided to sense a backup on the conveyor 12, and causes a signal to be produced to reduce the speed of the conveyor 12 to a medium speed. Another conditional responsive device 30 is positioned near the entrance of the infeed conveyor A for sensing a lack of products or articles on the infeed conveyor A and this sensor stops the infeed conveyor when such a condition occurs.

There is still another condition responsive device 32, positioned adjacent to main conveyor 12, where the articles are fed back onto the main conveyor. When a backup of articles is sensed by condition responsive device 32 on the main conveyor 12, such stops the outfeed conveyor B. A backup is sensed when the articles exiting off of the outfeed conveyor B are pressed against each other on the main conveyor 12.

Under normal operation the main conveyor 12 is running at a higher speed than the outfeed conveyor B, and as the articles are transferred from the outfeed conveyor B onto the main conveyor 12 a space is developed between the articles. The condition responsive device 32 is provided for ensuring that this space remains between the articles, and if the space is lost as a result of a backup of articles then the outfeed conveyor B is stopped. A still further condition responsive device 34 is positioned further down the line on the main conveyor, and when it senses that there is no space between the articles being delivered back onto the main conveyor a signal is generated, which is feed to the variable speed motor 22 driving the outfeed conveyor B, for reducing the speed of the variable speed motor 22. All of the signals generated by the conditional responsive devices are feed through conventional controllers such as programmable logic controller, which in turn is used for controlling the drive speed of the infeed drive motor 16, and the outfeed drive motor 22. One suitable programmable logical controller is manufactured by Allen Bradley and has a model number of SLC500 series. Allen Bradley is located in Milwaukee, Wis.

In order for the transport member D to move from the position shown in FIG. 2 to the position shown in FIG. 1 the speed of the infeed conveyor A must be running faster than the speed of the outfeed conveyor B. As a result, when the transport member D is moved in a counter clockwise direction it is loading articles from the infeed conveyor A to the outfeed conveyor B for storing the articles. As previously mentioned when the demand at the downstream receiving station increases then the speed of the outfeed conveyor B will increase over the speed of the infeed conveyor A; and due to the coupling provided between the infeed and outfeed conveyors and the transport member D, the transport member D will move in a clockwise direction from the position shown in FIG. 1 to the position shown in FIG. 2 to unload the articles stored in the accumulator.

The configuration for the parallel run of the infeed conveyor A and the outfeed conveyor B can vary depending on the amount of floor space that is desired to be utilized for the accumulator. In FIGS. 1 and 2 the configuration of the infeed and outfeed conveyors is in a spiral. In FIG. 3 the configuration of the infeed conveyor A and the outfeed conveyor B is also in a spiral but it has an elongated middle portion. If there is sufficient floor space the run of the two conveyors A and B can be in a horizontal plane.

Figure 4:
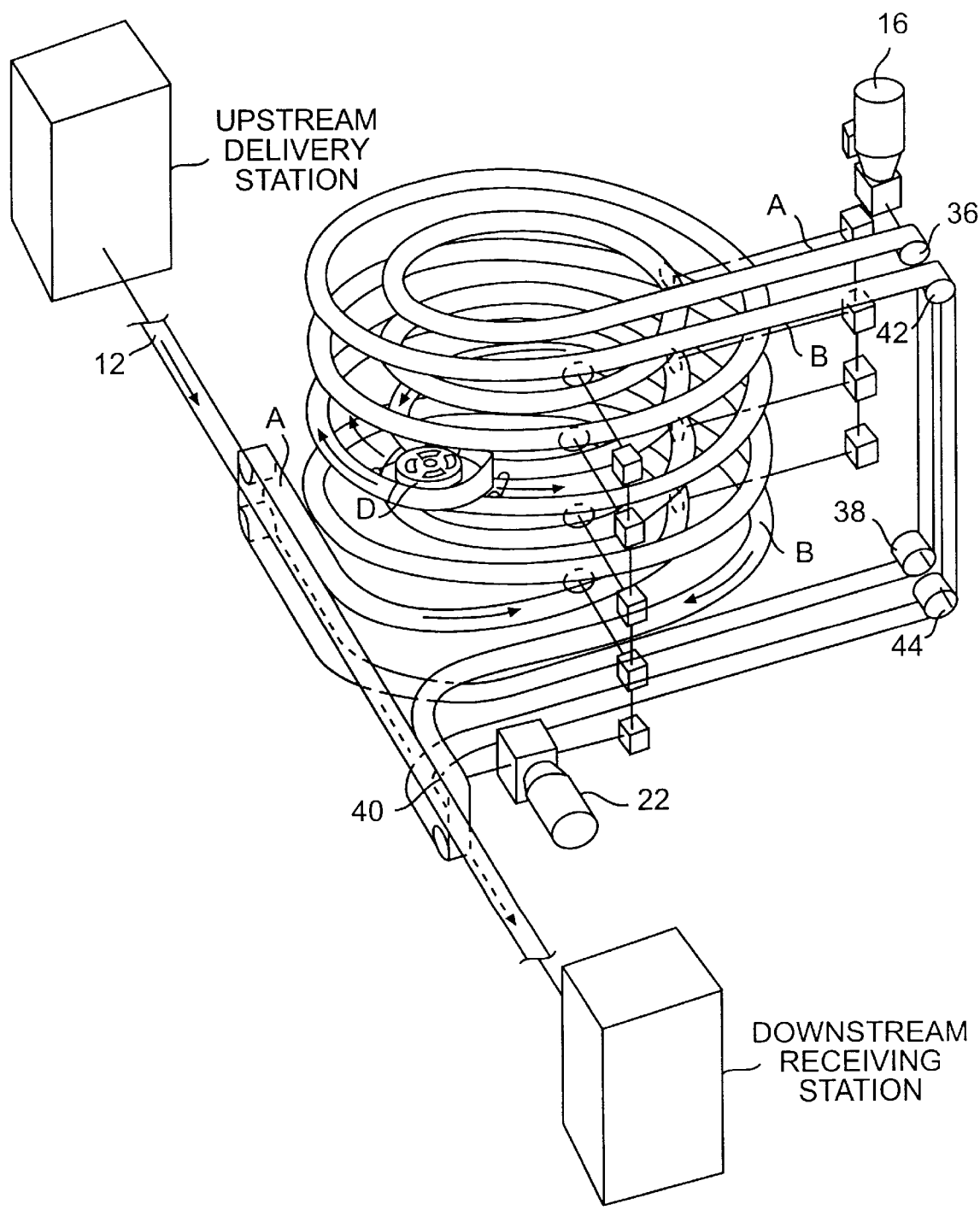
FIG. 4 is a schematic diagram illustrating an apparatus storing articles in a vertical spiral.

As shown in FIG. 4 the configuration of the infeed conveyor A and the outfeed conveyor B is in a vertical spiral so that a substantial amount of storage can be placed in a relatively small space. Sometimes as the height of the spiral increases it is necessary to drive the infeed and outfeed conveyors along the vertical path of the spiral so as to minimize the drag of the conveyors on the track. The drive mechanism is shown in schematic form in FIG. 4 and will be described in greater detail in connection with FIG. 17.

As can be seen in FIG. 4 the infeed conveyor A and the outfeed conveyor B are endless conveyors. The infeed conveyor A is driven by a motor 16, and its path extends upwards from adjacent the main conveyor 12 in a spiral configuration to pass over a drive sprocket 36 then down a vertical run through an idle sprocket 38 and back to the track which holds the conveyor in a vertical spiral. The track for holding the conveyor may be of any suitable construction and is supported on vertical posts 18 and cross bracing (not shown for purpose of clarity). The outfeed conveyor B is driven by the outfeed drive motor 22 by means of a drive sprocket 40. The conveyor belt B passes around idle sprockets 42 and 44 in its run.

Figure 5:
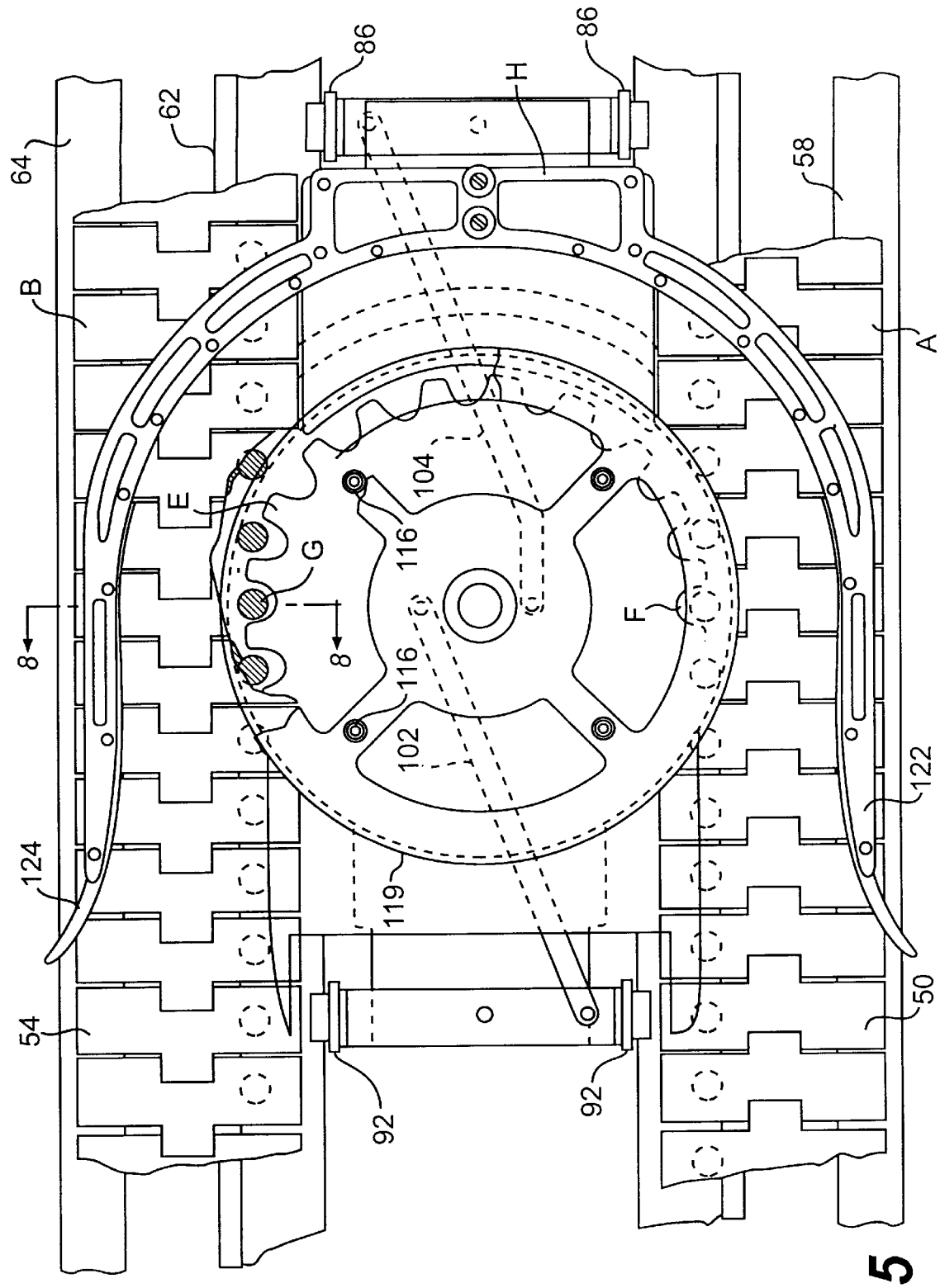
FIG. 5 is a plan view, partially in section, illustrating infeed and outfeed conveyors as well as a transport member forming part of the invention.
Figure 6:
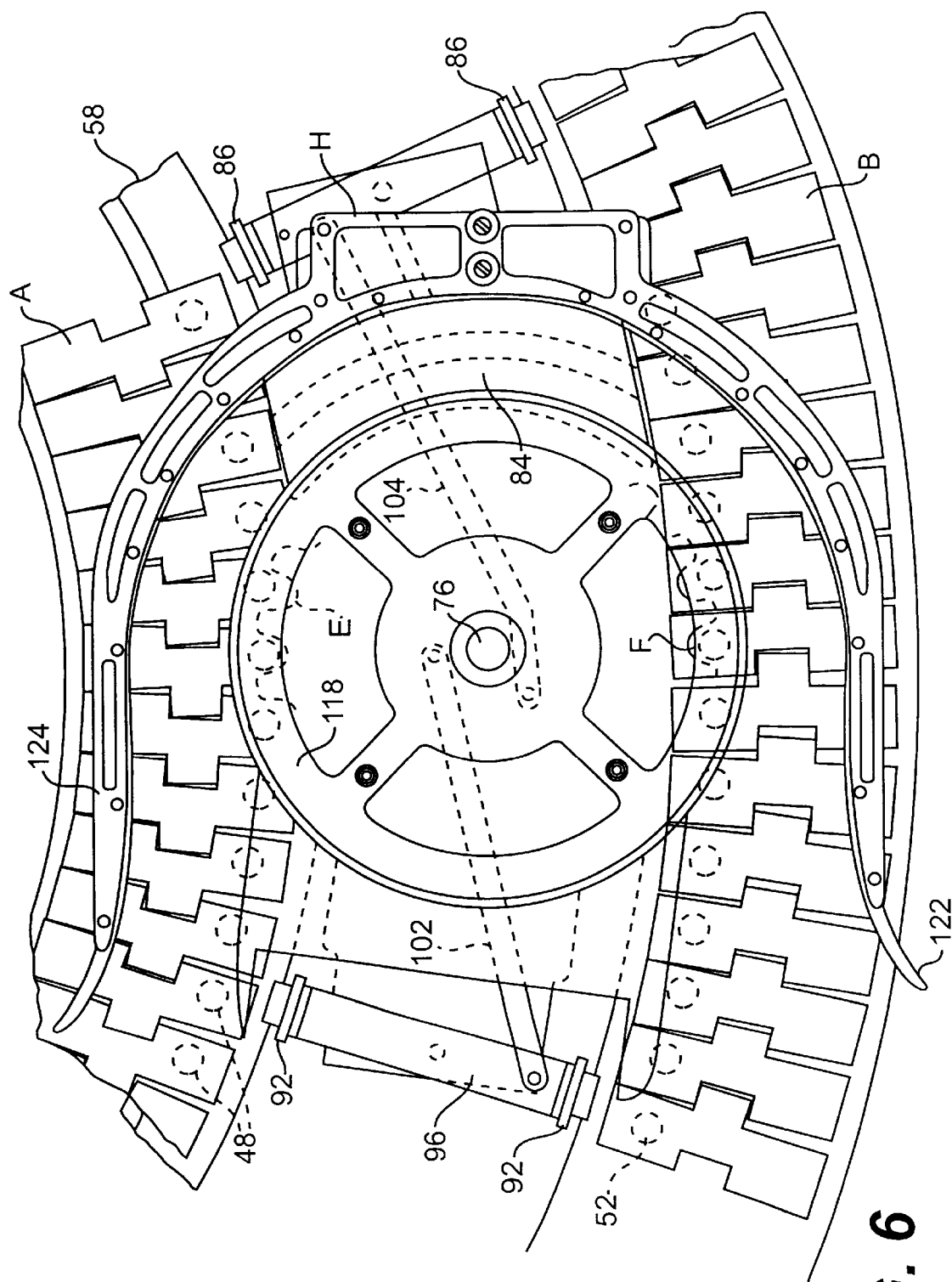
FIG. 6 is a plan view illustrating the transport member going around a curved portion of the track.

The infeed conveyor A and the outfeed conveyor B may be constructed of any suitable conventional chain belt that has connecting links, and in one particular embodiment has an upper surface such as shown in FIGS. 5 and 6. The lower surface has driving lugs 46 provided thereon which engage teeth provided on a sprocket carried by an output shaft of the infeed drive motor 16. The outfeed conveyor B engages teeth carried on a sprocket provided on an output shaft of the outfeed drive motor 22.

Figure 9:
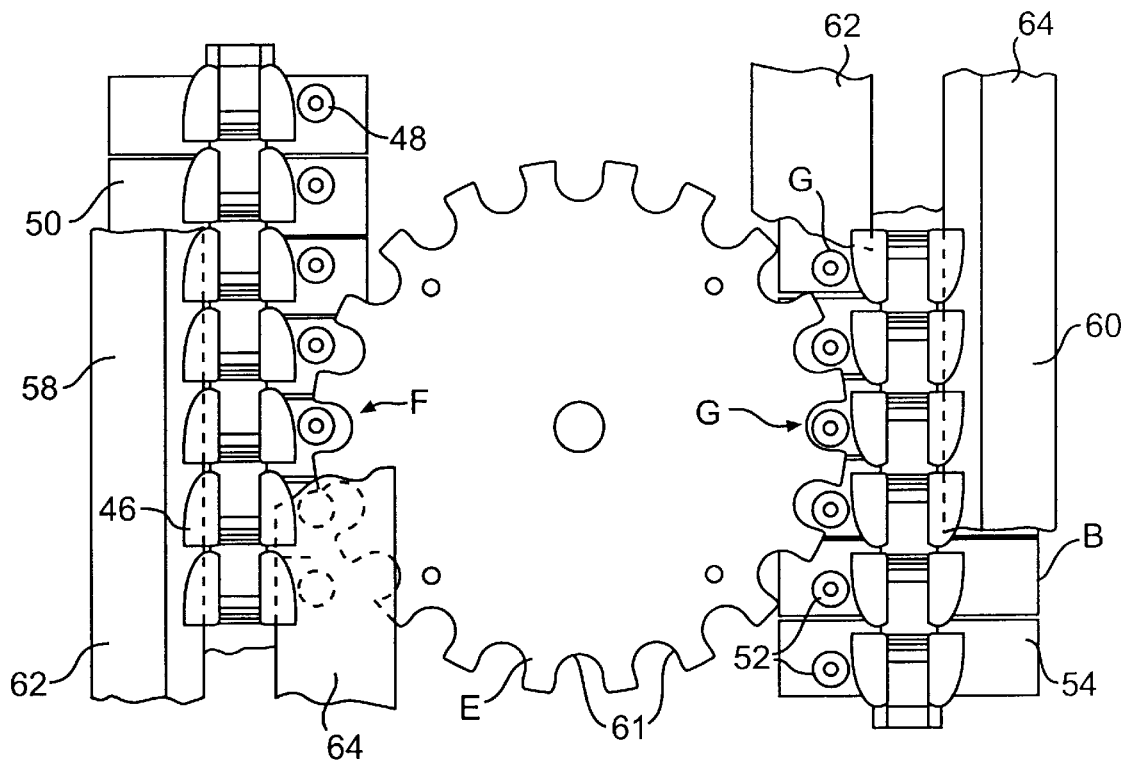
FIG. 9 is a sectional view taken along line 9—9 of FIG. 8 illustrating a rotatable member forming part of a transport member and drivers carried on the conveyors.

The driving links 46 have grooves provided so that the conveyor belts A and B can ride on the track 58 and 60. The track is defined by two elongated space strips 62 and 64 such as shown in FIG. 9. Drivers F in the form of posts 48 are carried on the lower surface of each of the links 50 of the infeed conveyor A. Similar drivers G in the form of posts 52 are provided on the lower surface of each of the links 54 of the outfeed conveyor B. The posts 48 and 52 extend downwardly from the links 50 and 54 respectively, for engaging teeth 61 provided in the rotatable member E.

As shown in FIG. 10 if the infeed conveyor A is moving to the right at a higher rate of speed than the outfeed conveyor B is moving to the left the posts 48 and 52, engaging the teeth 61 of the rotatable member E will cause the rotatable member E to rotate and also move to the right. For example the phantom line position drawn therein. If however, the outfeed conveyor B is moving to the left at a faster rate of speed than the infeed conveyor is moving to the right, then the rotatable member will be shifted to the left as it is rotated.

The rotatable member E is carried on a transport member D shown in an exploded view in FIG. 11. The transport member D includes a pair of elongated plates 68 and 70. The plates are substantially rectangular in shape and have curved inner ends 72 and 74 respectively provided thereon. A post 76 projects upwardly from the inner end of the plate 70 and extends through an opening 78 provided adjacent the inner end of plate 68. An arcuately shaped rectangular guide bar 80 is carried on the upper surface of the plate 70 that fits within a groove 82 provided in a lower surface of a dead plate 84. The dead plate is permitted to shift laterally slightly during the travel of the transport member around curves.

A set of wheels 86 are carried on a horizontally extending bar 88 carried adjacent to an outer end of the support plate 70. The horizontally extending bar 88 is pivotally attached to the support plate by a pivot pin 90. The wheels 86 are connected to upwardly extending flanges 86 carried on the horizontal member 88 so as to permit them to rotate freely thereon. A similar set of wheels 92 are carried on the outer ends of the plate 68 and are supported on vertically extending flanges 94 connected to opposite ends of the horizontal bar 96. The bar 96, in turn, is pivotally connected by means of a pivot post 98 to the plate 68. As a result, the wheels 86 and 92 can pivot about the pivot points 90 and 98 respectively, as the transport member moves around the curves included in the spiral track.

In order to stabilize the pivotal movement of the wheels and assist them in following the curvature of the track, connecting linkages 102 and 104 are pivotally connected to pivot posts 106 and 108, provided on the horizontal bars 88 and 96. The linkage arms 102 and 104 have downwardly extending posts 106 and 108 respectively, carried on the inner ends thereof, which project down within slots 110 and 112, provided in a circular plate 114. The circular plate is carried on the post 76. As a result of the linkage arms 102 and 104 when the transport member goes around a curved portion of the track, the wheels 86 and 92 follow the curvature of the track. The linkage arm 102 and 104 control the movement of the sets of wheels 86 and 92.

As previously discussed the rotatable member E is carried on the post 76, and has four circumferentially spaced, vertically extending pins 116, provided on an upper surface thereof. These pins 116 are provided for securing a guide wheel 118 on top of the rotatable member E. As a result of the pins 116 extending through bores 120 provided in the wheel, the wheel 118 is rotated with the rotatable member E.

An article transfer member H is carried by the transport member D and has a curvature similar to that of the curvature of a horseshoe. This is defined by a pair of spaced end portions 122 and 124 which are joined by an arcuately shaped intermediate portion 126 (see FIG. 11). The end portions 122 and 124 extend over the infeed conveyor A and the outfeed conveyor B respectively, as shown in FIGS. 1 through 3. The guide plate is spaced from the rim of the wheel 118, so as to define a path through which the articles 10 are guided as they are shifted from the infeed conveyor A to the outfeed conveyor B. Different sized and shaped wheels 118 can be placed on the pins 116 for varying the size of the path extending between the rim 119 of the wheel 118 and the inner surface of the guide plate H, and for transferring articles of different sizes and configurations.

Figure 7:
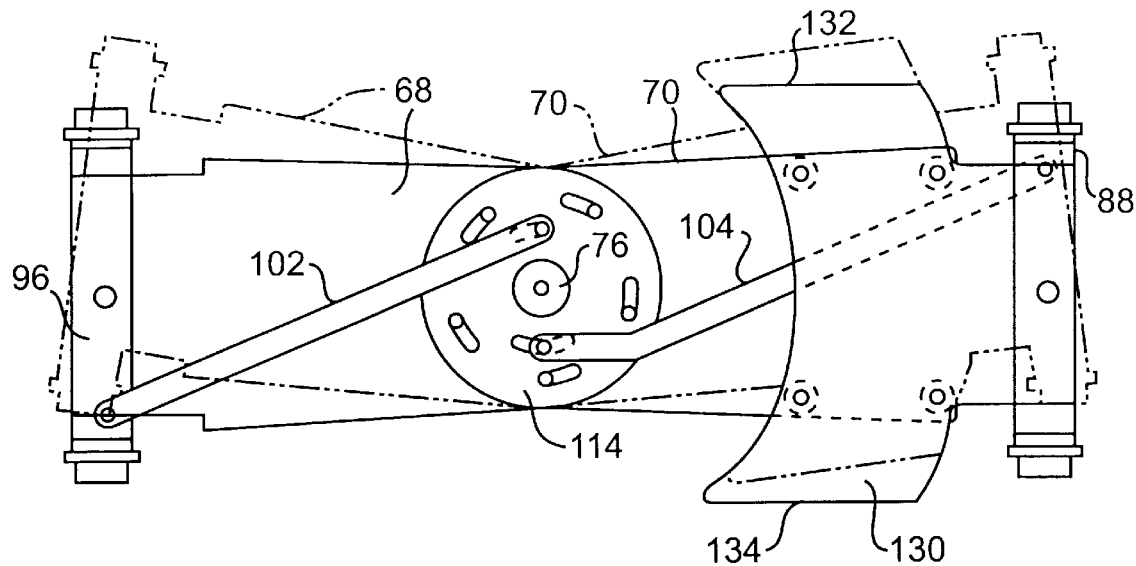
FIG. 7 is a plan view illustrating a linkage mechanism for controlling the movement of the wheels of the transport member.

In FIG. 7 the dead plate 130 over which the articles pass as they are moved from the infeed conveyor A to the outfeed conveyor B is shown as a flat plate 130 that has an inner edge 132 which terminates adjacent the edge of the infeed conveyor A, and has an opposing edge 134 which terminates closely adjacent the edge of the outfeed conveyor B. The plate 130 is carried by the transport member D. In the embodiment shown in FIG. 11 the dead plate is allowed to move slightly in the lateral direction on the rail 80.

Referring back to FIG. 7 there is shown how the plates 68 and 70 pivot about the posts 76, as the transport member D moves around the curves provided in the guide track so as to follow the guide track accurately. The movement of the plates 68 and 70 is shown in phantom lines in FIG. 7.

Figure 8:
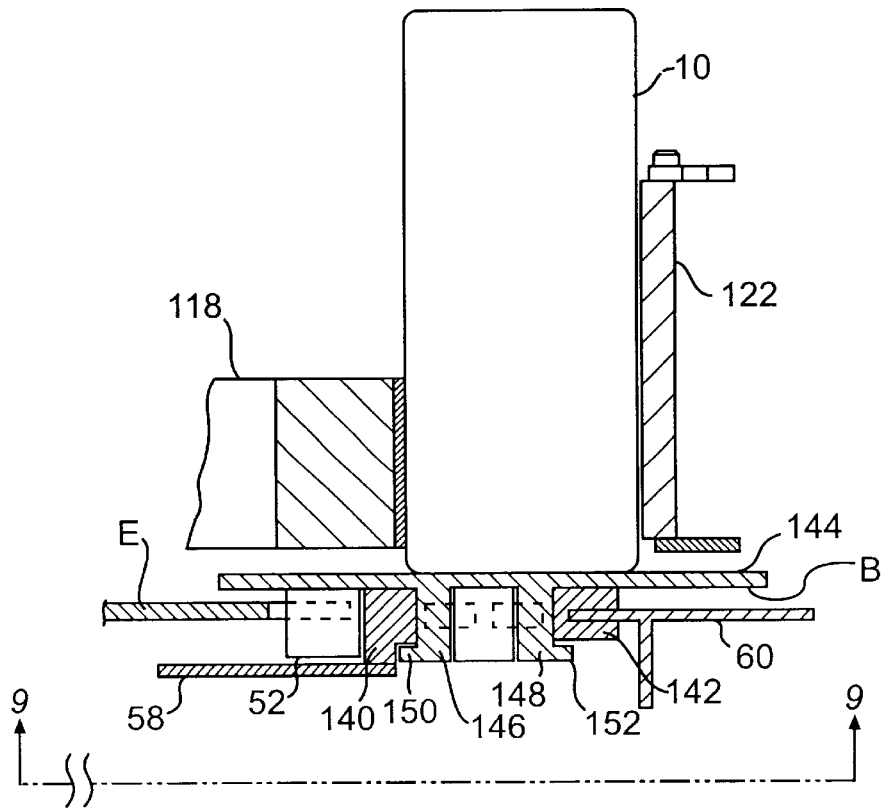
FIG. 8 is a cross-sectional view illustrating a track for supporting the outfeed conveyor and an article being transported thereon.

Referring to FIG. 8 of the drawings, the details of the track upon which the conveyor B is supported is illustrated. The track includes a pair of spaced plates 58 and 60. The plates 58 and 60 are in turn supported on a suitable support structure that holds them in a fixed relation; and the plates 58 and 60 define the track which guides the conveyor in the configuration, such as the spiral configuration shown in FIG. 4. The plate 58 has a bearing block 140 fixed on the inner end which is there to provide a frictionless surface upon which the links of conveyor B run. The plate 60 also has a "U" shaped bearing block 142 secured to the inner end thereof for supporting the links of conveyor B.

As can be seen, the links of the conveyor include a horizontally extending upper surface 144, which have a pair of downwardly extending space flanges 146 and 148 extending from a lower surface thereof. These flanges 146 and 148 have inwardly extending horizontal flanges 150 and 152 carried on a lower surface thereof, so as to define a groove into which the frictionless bearing blocks 140 and 148 ride when supporting the links of conveyor B. The same linkage is provided on the infeed conveyor A as illustrated on the outfeed conveyor B in FIG. 8.

The tracks 58 and 60 are supported by any suitable cross frames supported on the vertically extending posts 18, and can be supported to define any desired configuration for the infeed and outfeed conveyors A and B, as shown in FIGS. 1–4.

Figure 16:
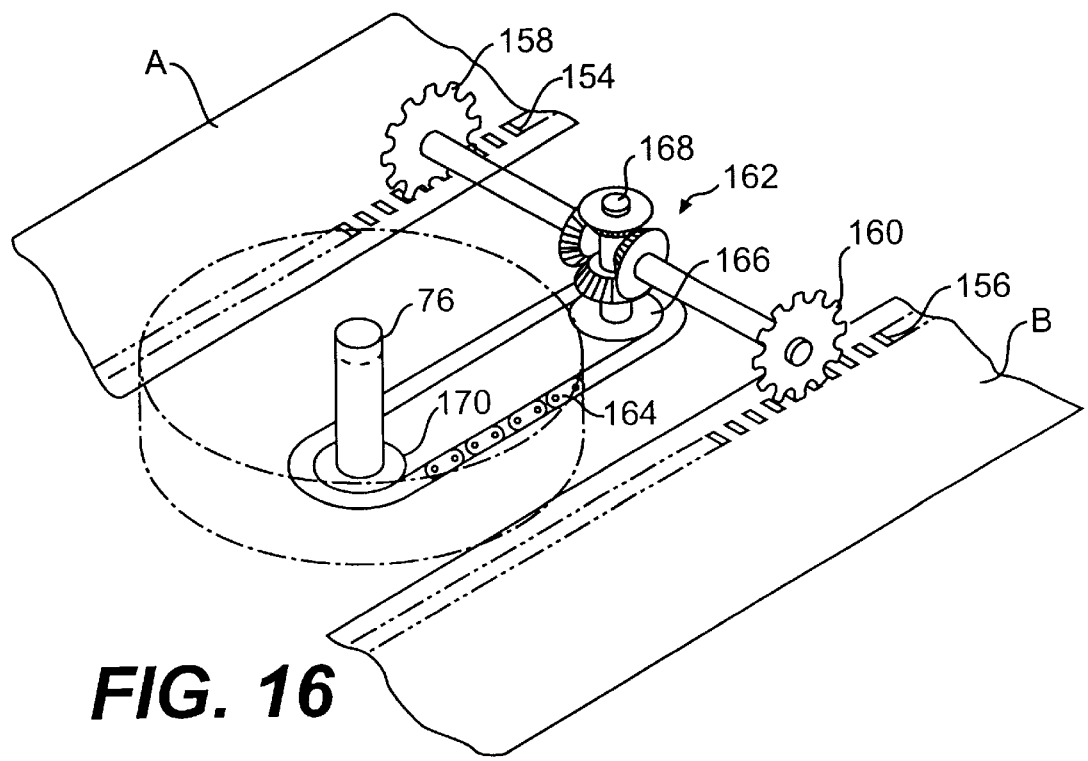
FIG. 16 is a perspective view illustrating a modified form of a drive mechanism for the transport member.

In FIG. 16 there is illustrated a modified form of the invention, and in particular the drive mechanism for the rotatable member E. The infeed conveyor A and the outfeed conveyor B have space slots 154 and 156 provided in the surface thereof, into which the teeth of sprockets 158 and 160 mesh. As a result, when the conveyors A and B are moving a driving rotational movement is imparted through the sprockets 158 and 160 to a differential gear arrangement 162 for driving a chain 164. The chain 164 is carried on a sprocket 166 which is secured to a shaft 168 forming part of the differential gear arrangement 162. The chain 164 extends around another sprocket 170 provided on the post 76 for rotating a rotatable member F. A wheel 118 can be placed on top of the rotating member E shown in FIG. 16 in the same manner as illustrated in FIG. 11. The purpose of FIG. 16 is to show a modified drive mechanism for rotating the rotatable member E.

Figure 15:
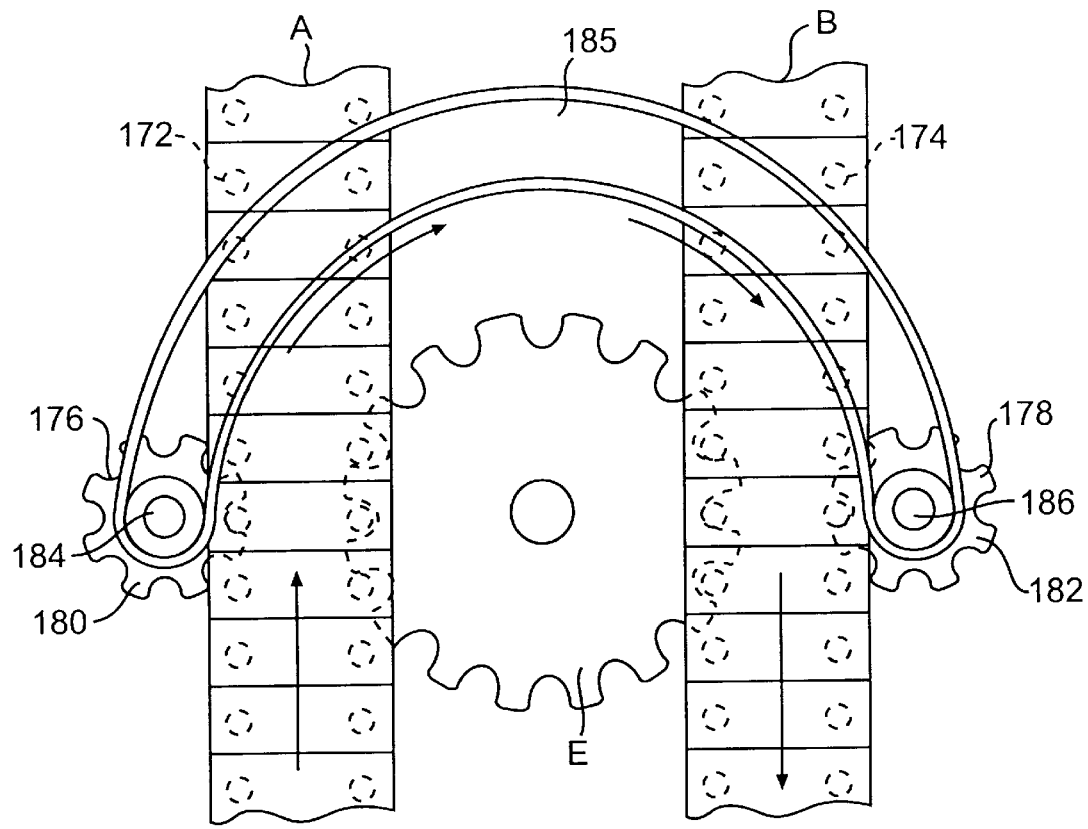
FIG. 15 is a plan view illustrating in schematic form a modified form of a deflecting member used with the transport member.

In FIG. 15 there is illustrated another modified form of the invention wherein instead of using the arcuately shaped deflection plate H, such as shown in FIG. 11, an arcuately shaped movable belt is driven by posts 172 and 174 extending downwardly from the lower surface of the infeed conveyor belt A and outfeed conveyor belt B. The post 172 and 174 engage teeth 176 and 178 respectively carried on sprockets 180 and 182. The sprockets 180 and 182 are in turn rotatably supported on shafts 184 and 186 that are carried on a lower service of the transport member. A moveable belt 185 extends around the sprockets 180 and 182, and is carried in a curved configuration defined by any suitable arrangement of idle roles not shown. The belt 185 is driven by the infeed and outfeed conveyors A and B providing a moving surface for the articles being transferred from the infeed conveyor to the outfeed conveyor. The details of the transport member are not illustrated in FIG. 15 for purposes of clarity. The moving belt 185, in conjunction with the wheel 118, transports the articles 10 from the infeed conveyor A to the outfeed conveyor B, by providing two moving surfaces which engage opposite sides of the articles 10.

Figure 13:
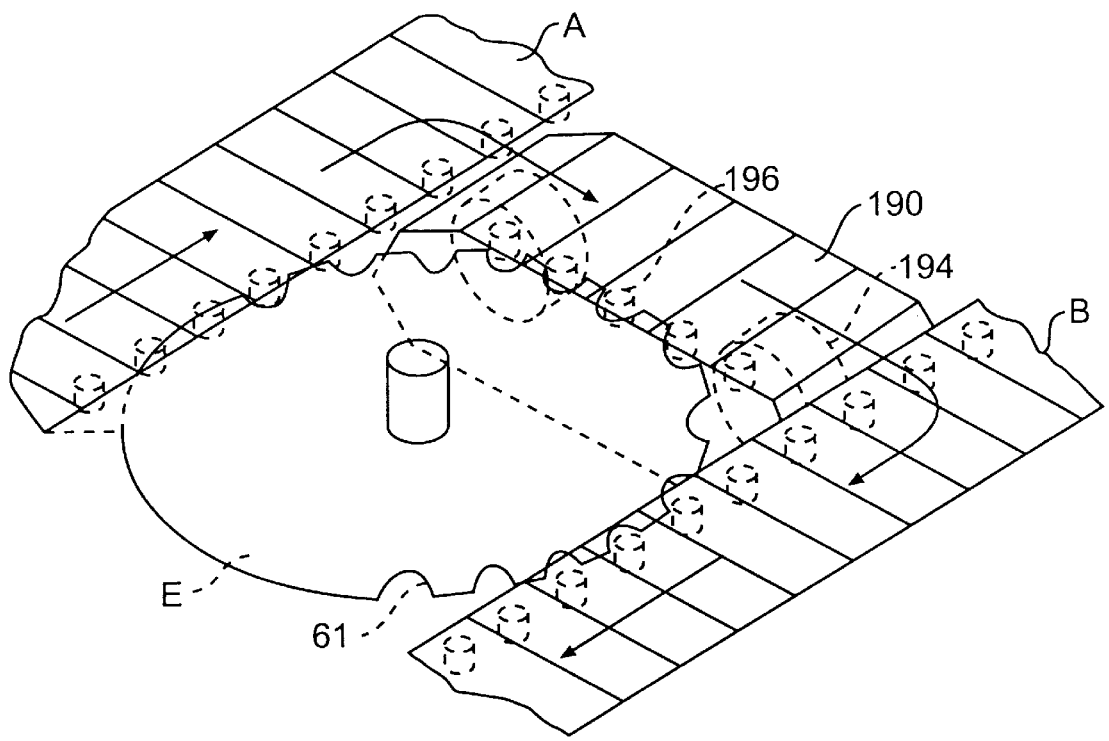
FIG. 13 is a schematic representation of a modified form of the transport member.

Referring now in more details to FIG. 13. Instead of the transport member D having a dead plate 84 over which the articles 10 are transported from the infeed conveyor A to the outfeed conveyor B, a moveable belt 190 is carried by the transport member D, and is supported for rotation on idle wheels 192 and 194. The moveable belt 190, has posts 196 provided on a lower surface thereof, which engage the teeth 61 of the rotatable member E. The belt 190 is driven by the rotatable member E for aiding in transporting the articles 10 from the infeed conveyor A to the outfeed conveyor B.

Figure 14:
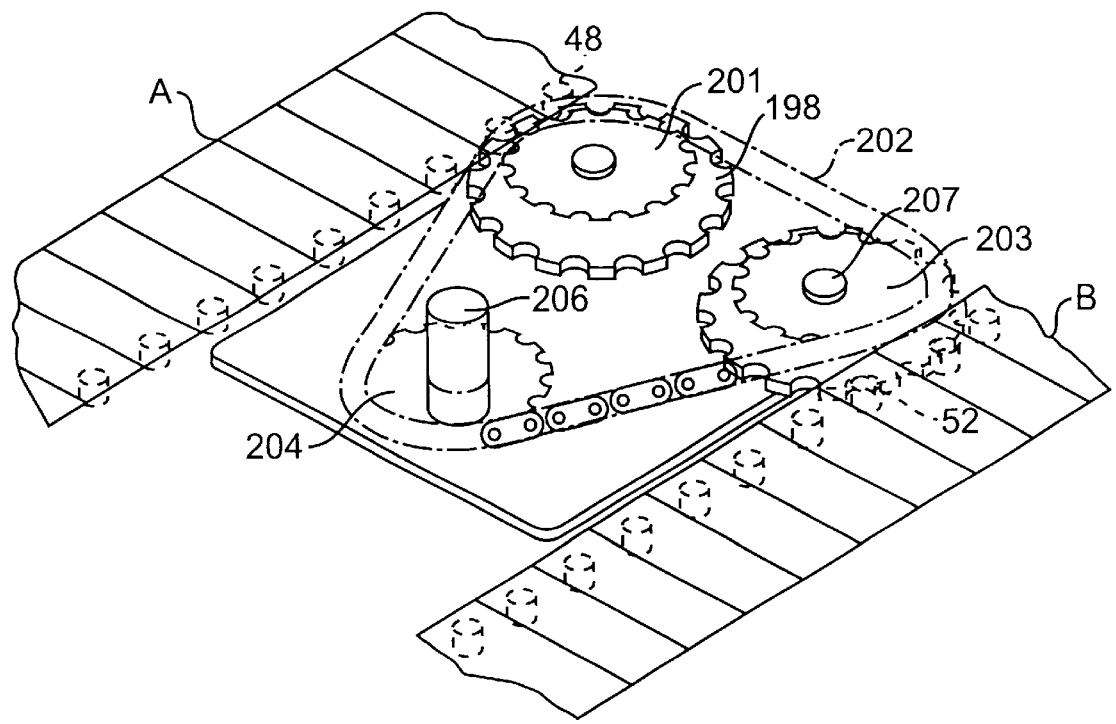
FIG. 14 is a perspective view illustrating a modified form of the drive mechanism for the transport member.

Instead of using a single gear toothed rotatable member E, such as shown in FIG. 13, the drive mechanism for the wheel 118 that is carried on the transport member can be a chain drive, such as illustrated in FIG. 14. In FIG. 14, two sprockets 198 and 200 are carried on a plate forming part of the moveable member. A chain 202 extends around two driven sprockets 201 and 203, which are rotated by the shafts 205 and 207 that the sprockets 198 and 200 are fixed to. The sprockets 198 and 200 are rotated as the sprockets engage the posts 48 and 52 carried on the lower surface of the infeed and outfeed conveyors A and B respectively. The chain 202 extends around a sprocket 204 that in turn is rotated around posts 206. The chain 202 and sprocket arrangement shown in FIG. 4 performs the same function as the rotatable gear E shown in FIG. 11. The remaining structure, such as the rotatable wheel 118 and guide plate H, could be the same as the structure included in the transport member D of FIG. 11.

Figure 17:
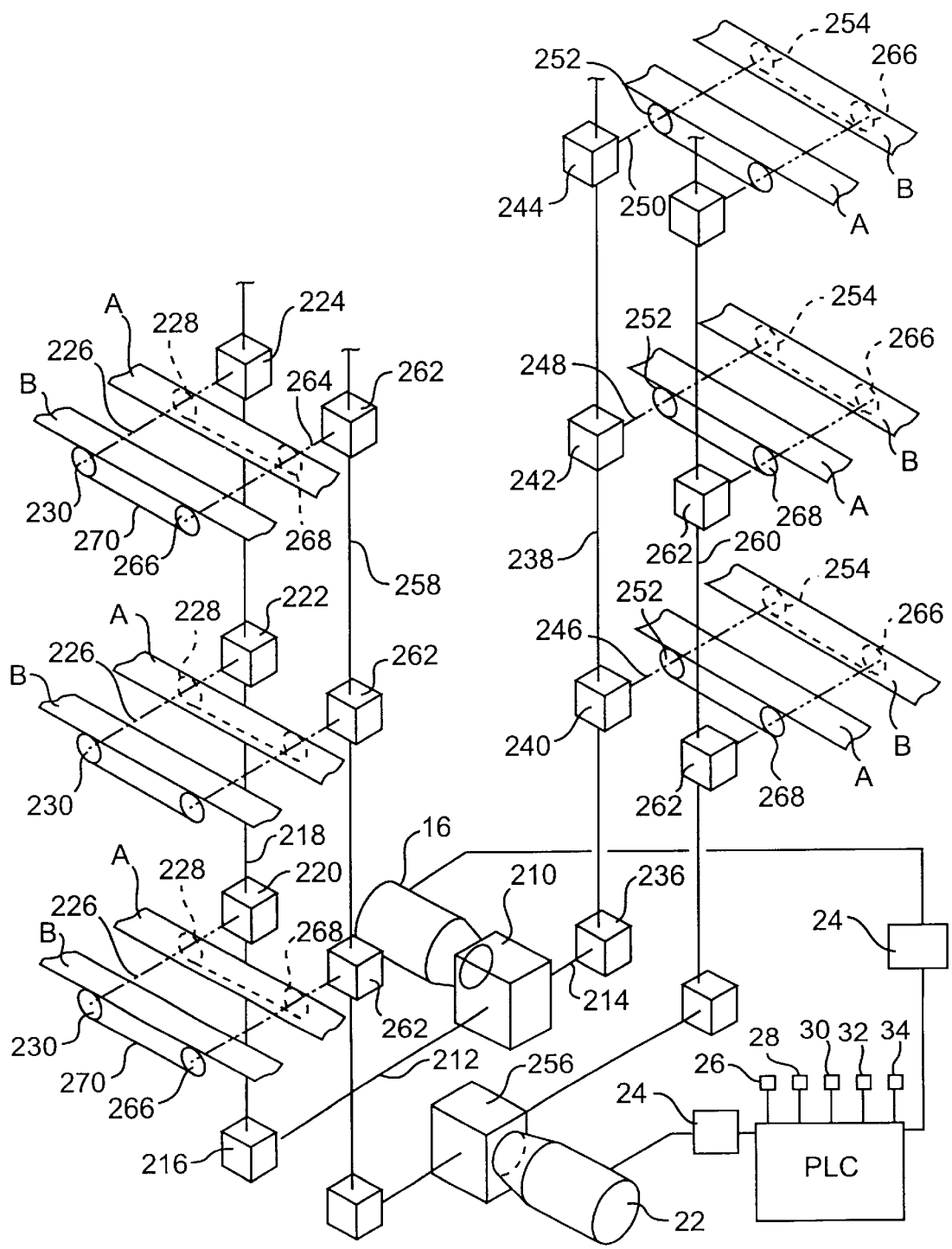
FIG. 17 illustrates in partial schematic form the driving connection for driving the infeed and outfeed conveyors when carried in a spiral configuration.

When the configuration of the infeed and outfeed conveyors A and B extends vertically upwardly in several layers, such as shown in FIG. 4, it is desirable that each layer of the conveyor is driven from the infeed drive motor 16 and the outfeed drive motor 22. This overcomes the drag produced by the long run of the conveyor chains A and B. In FIG. 17, there is illustrated a drive mechanism for such a spiral configuration. The various layers of the infeed and outfeed conveys A and B are shown stacked one upon the other in FIGS. 4 and 17. The infeed motor 16 is connected through a gear box 210 which has output drive shafts 212 and 214 extending outwardly therefore. The output drive shaft 212 is connected to a gear box 216 which is connected to a vertically extending shaft 218. The vertically extending shaft 218 has gear boxes 220, 222 and 224 spaced therealong, so that there is a drive connection from the motor 16 to each of the gear boxes 220, 222 and 224. Each of the gear boxes 220, 222 and 224 have an output shaft 226 which drives a driving gear 228 that is a driving engagement with the infeed conveyor A. An idle gear 230 is provided on the outer end of the shafts 226 that engage the outfeed conveyor B. The output shaft 214 of the gearbox 210 is connected to a gear box 236 which in turn drives a vertically extending shaft 238. The vertically extending shaft 238 has gear boxes 240, 242 and 244 spaced vertically therealong. Gear boxes 240, 242 and 244 have output shafts 246, 248 and 250 respectively. Each of these shafts, 246, 248 and 250 have driving gears 252 provided thereon, which engage the lugs of the infeed conveyor A for driving the various layers of the infeed conveyor A. Idle gears 254 are carried on the end of the shafts 246, 248 and 250 for engaging the outfeed conveyor B.

The outfeed conveyor B is driven by the variable speed motor 22 through a gear box 256. The gear box 256 in turn is used for driving vertically extending shafts 258 and 260. The vertically extending shafts 258 and 260 have gear boxes 262 provided along the length thereof. Each of the gear boxes 262 have an output shaft 264 extending therefrom for driving a sprocket 266 which engages the outfeed conveyor B. An idle sprocket 268 engages the infeed conveyor A. Chains 270 and 272 extend between the driven sprocket 266 and the idle sprocket 230 such as shown on the top left, and the driven sprocket 228 as well as the idle sprocket 268. The chains extending around a driven sprocket and an idle sprocket aids, in stabilizing the driving force imparted to the conveyor belts A and B.

The condition responsive devices 26, 28, 30, 32 and 34 (FIG. 1) sense the various flow of articles on the conveyors, such as described above in connection with FIG. 1, and send signals to a PLC which is used for varying the speed of the outfeed motor 22. As previously mentioned, the speed of the main conveyor 12 can be stopped. Also, the speed of the infeed conveyor A and outfeed conveyor B can be stopped depending on the flow of articles through the accumulator as described previously.

Figure 19:
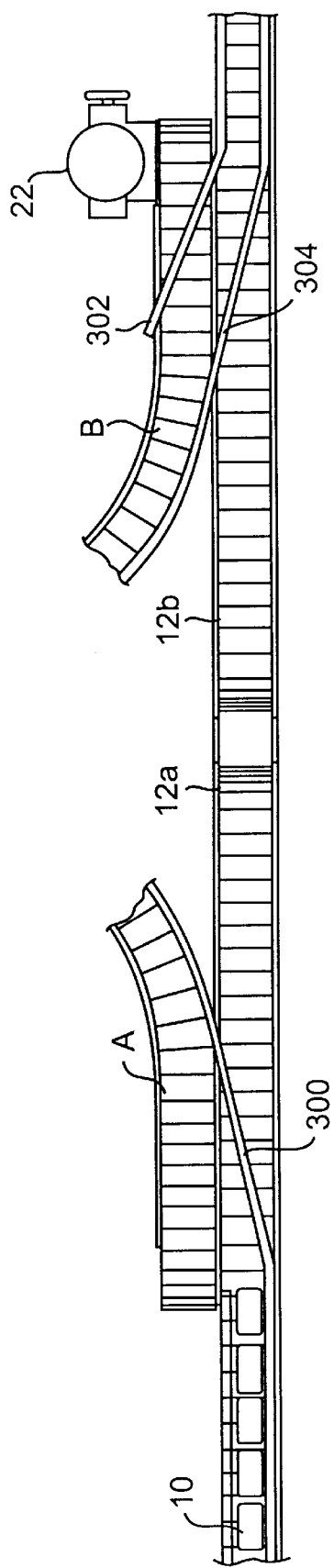
FIG. 19 is a plan view illustrating a modified form of the main conveyor.
Figure 20:
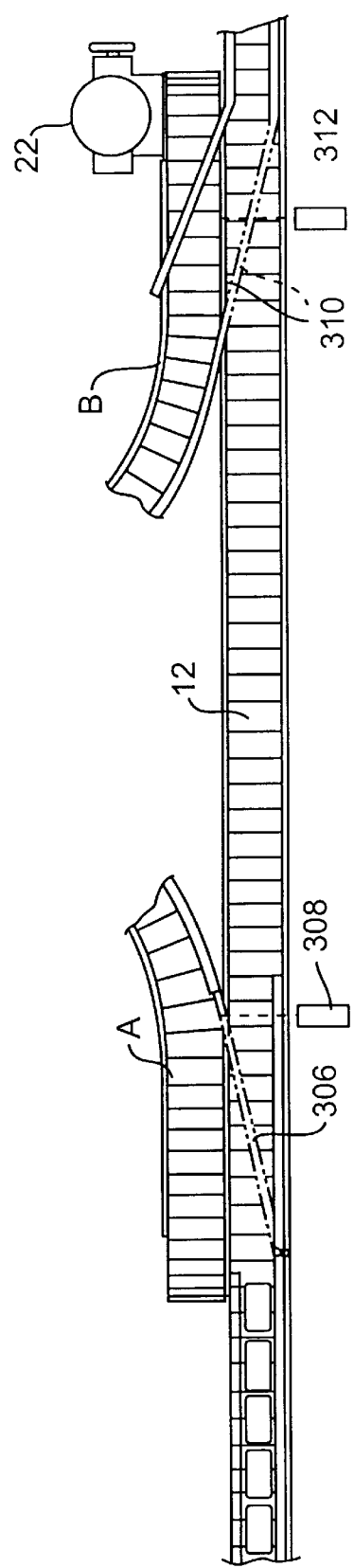
FIG. 20 is a plan view illustrating a modified form of the main conveyor and the mechanism for deflecting the articles off the main conveyor and for receiving the articles back on the main conveyor.

In FIGS. 19 and 20 there are illustrated two different arrangements for the main conveyor 12 which transports the articles 10 from the upstream station to the downstream station. In the embodiment illustrated in FIG. 19, the main conveyor includes two conveyors 12a and 12b. The articles being transported on the main conveyor 12a are deflected onto the infeed conveyor A by means of an angled deflecting rail 300. The articles coming off the outfeed conveyor B are guided onto the main conveyor 12b by the spaced guide rails 302 and 304.

In FIG. 20 instead of using two main conveyors 12a and 12b a single main conveyor 12 is utilized. When it is desired to deflect the articles from the main conveyor 12 to the infeed conveyor A, a deflecting guide rail 306 is moved by a pneumatic or hydraulic cylinder 308 from the full line position to the phantom line position. When the guide rail is moved to the full line position the accumulating function is taken out of service, and the articles are moved directly along the main conveyor. A similar deflecting plate 310 is associated with the outfeed conveyor B, and when it is desired that the articles be allowed to flow directly from the upstream delivery station to the downstream receiving station without going through the accumulator, the deflecting plate 310 is moved to the full line position. However, when the accumulator is in use, the deflecting plate is moved to the phantom line position by means of a pneumatic or hydraulic cylinder 312.

SUMMARY OF THE OPERATION

Attention is directed to FIG. 2 of the drawings. As can be seen in FIG. 2, articles 10 are feed on the main conveyor 12 onto an infeed conveyor A which is an endless conveyor belt. The articles are then moved on the infeed conveyor A up and around the infeed conveyor A until they engage a deflecting plate H carried on a transport member D. The deflecting plate H deflects the articles over the movable transport member D from out the infeed conveyor A to the outfeed conveyer B. If the speed of the outfeed conveyor B is the same as the speed of the infeed conveyor A, then the articles merely moved over the dead plate 84 of the transport member D to the outfeed conveyor B, and are fed back onto the main conveyor 12. However, if for example there is no demand for articles from the downstream receiving station, and as a result the outfeed conveyor is stopped, the transport member D will move in a counter clockwise direction around the spiral causing the articles being feed in on the infeed conveyor A to be lined up on the outfeed conveyor B. This action continues until the transport member D reaches the top of the spiral, wherein it engages a limit switch that stops the entire accumulation system.

If, however, prior to reaching the top of the spiral the downstream receiving station begins taking articles from the main conveyor 12 a signal is generated, by the condition responsive devices 32 and 34, turning on the motor 22 driving the outfeed conveyor B. The outfeed conveyor B begins running faster than the infeed conveyor A, and as a result, the articles are transferred in sequence from the outfeed conveyor B back onto the main conveyor 12. The incoming articles 10 that are being feed on the infeed conveyor A are continuously loaded on the outfeed conveyor but, as a result of the transport member moving in a clockwise direction, the number of articles in the accumulator decreases until the accumulator is entirely empty. When the transport member reaches the bottom of the spiral it engages another limit switch which stops the transport member from any further movement.

The movement of the transport member D is controlled by the speed of the infeed and outfeed conveyors A and B.

Referring now to FIG. 10, the infeed conveyor A and the outfeed conveyor B have posts 48 and 52 provided thereon which engage the teeth of a rotatable member E. If the speed of the infeed conveyor A is the same as the speed of the outfeed conveyor B then the transport member D, which carries a rotatable member E, remains in the same position. However, if the outfeed conveyor B slows down relative to the infeed conveyor, the moveable member will be moved to the right as illustrated in FIG. 10, and the articles are loaded along the outfeed conveyor B until the speed of the outfeed conveyor B is increased to deliver more articles to the downstream receiving station.

When the speed of the outfeed conveyor increases above the infeed conveyor A, such causes the transport member to rotate rotatable member E to move to the left and unload the accumulator.

One advantage of this accumulator is that the first article in is the first article out (FIFO), and as a result the sequence from which the articles are fed from the upstream delivery station is always maintained.

When the articles are fed from the upstream delivery station there is normally a space between the articles. The speed of the infeed conveyor A is slower than the speed of the main conveyor 12, and as a result when the articles 10 are transferred from the main conveyor 12 onto the infeed conveyor A, they are positioned close to each other with very little space therebetween. When the articles 10 return to the main conveyor 12 from the outfeed conveyor a space is produced between the articles.

Since the articles do not move relative to the surface of the conveyors A and B. there is very little rubbing between the articles as they are being stored and removed from the accumulator. This minimizes any damage or scraping of the labels carried on the articles.

The condition responsive devices 26, 28, 30, 32 and 34 control the speed of the conveyors through a programmable logic controller. If, for example, the downstream receiving station stops receiving articles 10, the articles 10 will back up on the main conveyor 12 and the photocell 34 senses such backup and sends a signal to the PLC to reduce the speed of the outfeed conveyor B. If the backup of the articles extends to the condition responsive device 32 as a result of the lost spacing between the articles, then the condition responsive device 32 generates a signal that is fed to the PLC which stops outfeed conveyor B. This causes the articles to be loaded into the accumulator from the bottom of the spiral to the top.

If prior to the transport member D reaching the top of the spiral a signal is received indicating that the downstream receiving station can receive more articles, the PLC under the control of the condition responsive devices 32 and 34 send a signal to the outfeed motor 22 increasing the speed of the outfeed conveyor B above the speed of the infeed conveyor A. When this occurs the articles that have been stored in the accumulator are fed by the outfeed conveyor B back onto the main conveyor to the downstream receiving station. Since the articles that are being fed into the accumulator on the infeed conveyor A is at a slower rate than they are being removed from the accumulator by the outfeed conveyor, such causes the transport member to move in a clockwise direction until the accumulator is entirely emptied.

Figure 21:
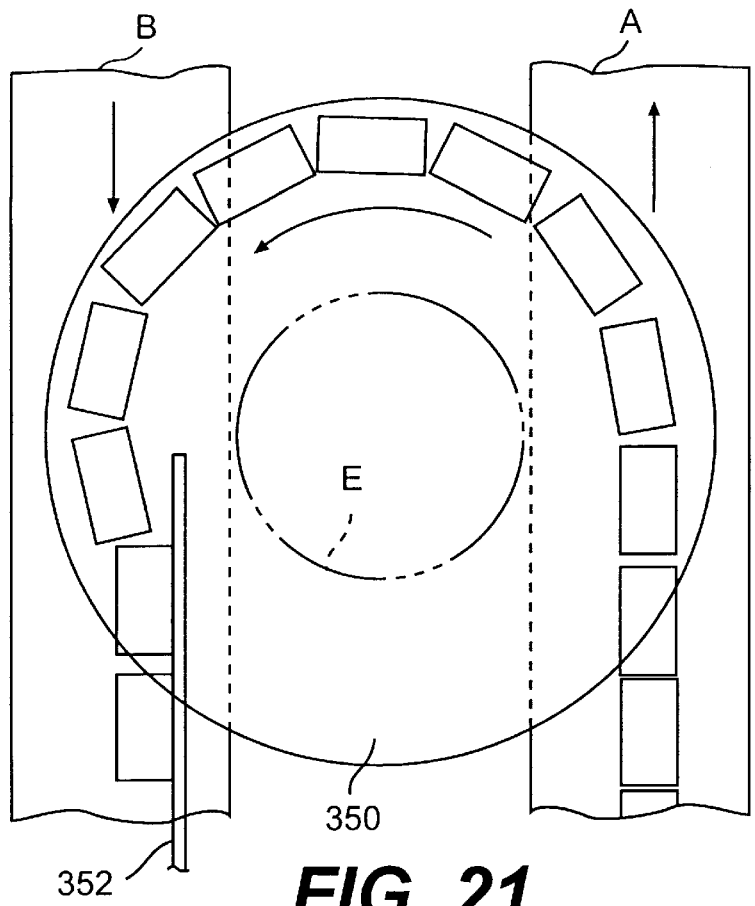
FIG. 21 is a plan view illustrating in schematic form a modified form of the transport member.

Referring now to FIG. 21 of the drawing, there is illustrated a modified form of the invention. The rotatable member E, which is driven by the infeed and outfeed conveyors A and B, has provided on top thereof a thin flat large diameter metal plate 350 that extends over the upper surface of the infeed conveyor A and outfeed conveyor B for transferring articles 10, being transported on the infeed conveyor A to the outfeed conveyor B. The articles being moved on the infeed conveyor A ride up on the upper surface of the thin metal plate 350, and as the metal plate 350 is rotated by the rotatable member E, it transports the articles 10 over the upper surface of the outfeed conveyor B. A deflecting rail 352 is used for deflecting the articles from the upper surface of the flat plate 350 on to the conveyor B.

Figure 22:
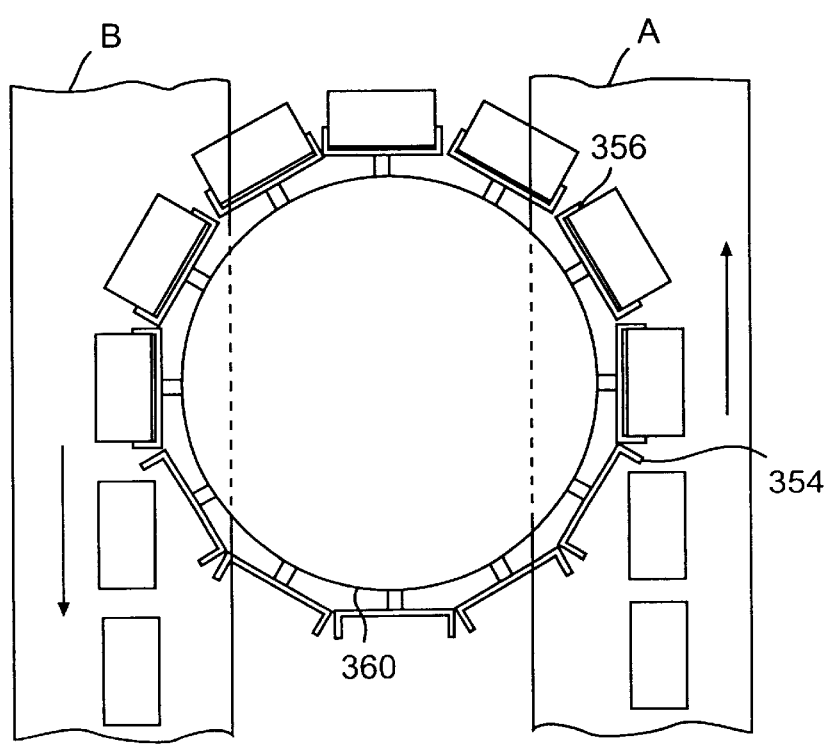
FIG. 22 is a plan view illustrating in schematic form a modified form of a transfer member forming part of the invention.

Still another modified form of the invention is disclosed in FIG. 22, wherein griping arms 354, projecting outwardly from a rotatable housing 360, are used for gripping the articles 10 moving on the infeed conveyor A and transferring the articles to the outfeed conveyor B. The grippers 354 can be any suitable gripping jaws that are closed by a cam or any other suitable mechanism as the gripping jaws pass over the infeed conveyor A for gripping the articles 10 and transporting them over to the outfeed conveyor B where they are released. The housing 360 can be driven by the rotatable member described in the earlier embodiments.

While the drivers F and G between the rotatable member E and the infeed conveyor A and outfeed conveyor B has been shown in one particular embodiment as being post 48 and 52 provided on the lower surface of a conveyor meshing with teeth 61 provided on the rotatable member E, it is to be understood that such driving connection between the infeed and outfeed conveyors A and B, and the rotatable members could be accomplished by other means such as, for example, placing sockets or teeth on the conveyor belts A and B and mounting the posts on the rotatable member E.

Figure 18:
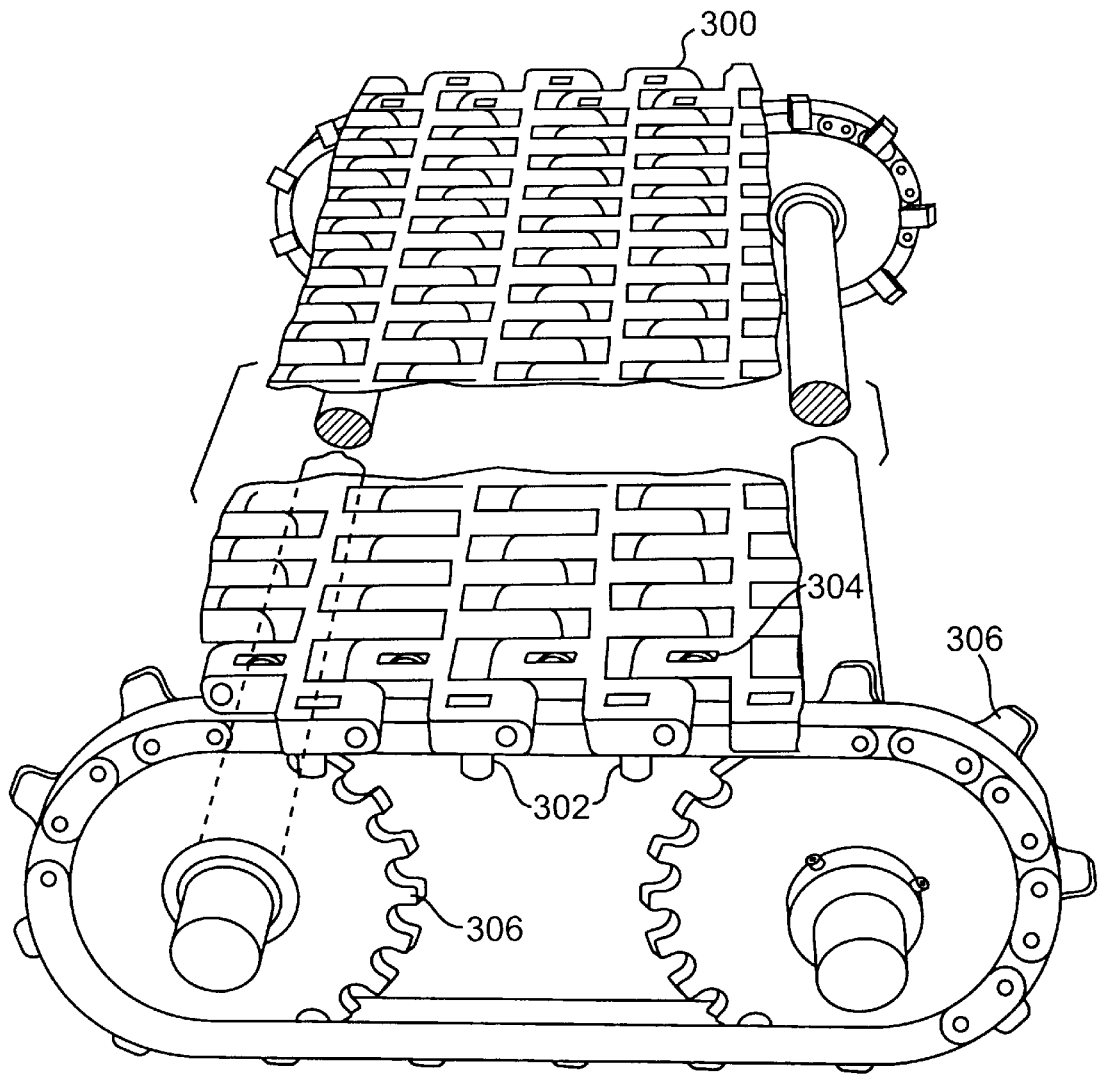
FIG. 18 is a perspective view illustrating the driving mechanism for driving a conveyor belt of a modified configuration.

In FIG. 18 there is illustrated a different type of conveyor belt that could be utilized with the invention. The conveyor belt includes links 300 which are joined together along the length of the conveyor as well as across the conveyor. This is a conventional link belt type of conveyor chain. Posts 302 are mounted to the lower ends of the links carried on the outside of the chain for driving the rotatable member E such as shown in FIG. 10. The conveyor chain has openings 304 provided therein into which teeth 306 carried on sprockets extend for producing a driving relation between the sprockets. The primary purpose of including the chain of FIG. 18 is to illustrate that any suitable conventional conveyor belt can be modified to be utilized as part of the accumulator.

While preferred embodiments of the invention have been described above, it is be understood that any and all equivalent realizations of the present invention are included within the scope and spirit thereof. Thus, the embodiments depicted are presented by way of example only and are not intended as limitations upon the present invention. While particular embodiments of the invention have been described and shown, it will be understood by those of ordinary skill in this art that the present invention is not limited thereto since many modifications can be made. Therefore, it is contemplated that any and all such embodiments are included in the present invention as may fall within the literal or equivalent scope of the appended claims.

What is claimed:

1. An apparatus for controlling the flow of articles comprising:

an infeed conveyor for transporting said articles;

an outfeed conveyor;

a support structure supporting said infeed conveyor and said outfeed conveyor wherein a substantial portion of the run of said conveyors are parallel to each other providing a space therebetween;

a transport member carried by said support structure in said space between said infeed and outfeed conveyors;

infeed drive mechanism driving said infeed conveyor in one direction;

outfeed drive mechanism driving said outfeed conveyor in a second direction;

a variable speed control operatively connected to said outfeed drive mechanism for varying the speed of said outfeed conveyor;

a rotatable member carried by said transport member;

drivers carried by said infeed conveyor engaging said rotatable member for rotating said rotatable member;

drivers carried by said outfeed conveyor engaging said rotatable member for rotating said rotatable member and causing said transport member to move along a path parallel to said infeed conveyor and said outfeed conveyor at a speed and direction depending on the relative speed of said infeed conveyor and said outfeed conveyor;

an article deflecting member carried by said transport member for deflecting articles from said infeed conveyor to said outfeed conveyor;

said drivers carried by said infeed conveyor include driving lugs equally spaced along the infeed conveyor; and said rotatable member having sockets meshing with said driving lugs for rotating said rotatable member.

2. The apparatus as set forth in claim 1 wherein said article deflecting member includes:

an arcuately shaped deflector plate having one end extending over the run of said infeed conveyor and another end extending over the run of said outfeed conveyor for deflecting articles from said infeed conveyor to said outfeed conveyor.

3. The apparatus as set forth in claim 2 further comprising:

a vertically extending axle carried by said transport upon which said rotatable member rotates;

a wheel rotated by said rotatable member having a rim spaced from said arcuately shaped deflector plate providing a path through which spaced articles are deflected from said infeed conveyor to said outfeed conveyor.

4. The apparatus as set forth in claim 2 further comprising:

a vertically extending axle carried by said transport member upon which said rotatable member is carried;

a wheel fixed to said rotatable member having a rim spaced from said arcuately shaped deflector plate providing a path through which spaced articles are deflected from said infeed conveyor to said outfeed conveyor.

5. The apparatus as set forth in claim 2 further comprising:

a vertically extending axle carried by said transport upon which said rotatable member rotates;

a wheel rotated by said rotatable member having a rim spaced from said arcuately shaped deflector plate providing a path through which spaced articles are deflected from said infeed conveyor to said outfeed conveyor.

6. The apparatus as set forth in claim 1 further comprising:

said drivers carried by said outfeed conveyor include driving lugs equally spaced along said outfeed conveyor; and said sockets provided on said rotatable member meshing with said driving lugs of said outfeed conveyor providing a driving coupling between said rotatable member and said outfeed conveyor.

7. The apparatus as set forth in claim 6 wherein said driving lugs are vertically extending posts.

8. An apparatus for controlling the flow of articles comprising:

an infeed conveyor for transporting said articles;

a main conveyor feeding articles to said infeed conveyor;

an outfeed conveyor;

a support structure supporting said infeed conveyor and said outfeed conveyor wherein a substantial portion of the run of said conveyors are parallel to each other providing a space therebetween;

a transport member carried by said support structure in said space between said infeed and outfeed conveyors;

infeed drive mechanism driving said infeed conveyor in one direction;

outfeed drive mechanism driving said outfeed conveyor in a second direction;

said outfeed drive mechanism including a variable speed motor;

a variable speed control operatively connected to said outfeed drive mechanism for varying the speed of said outfeed conveyor;

a rotatable member carried by said transport member;

drivers carried by said infeed conveyor engaging said rotatable member for rotating said rotatable member;

drivers carried by said outfeed conveyor engaging said rotatable member for rotating said rotatable member and causing said transport member to move along a path parallel to said infeed conveyor and said outfeed conveyor at a speed and direction depending on the relative speed of said infeed conveyor and said outfeed conveyor;

an article deflecting member carried by said transport member for deflecting articles from said infeed conveyor to said outfeed conveyor;

said variable speed control including a condition responsive device generating signals indicating the flow of articles from said outfeed conveyor and feeding said signals to said variable speed motor for adjusting said speed of said variable speed motor responsive to the flow of articles from said outfeed conveyor.

9. The apparatus as set forth in claim 8 wherein said variable speed control includes a programmable logic controller for varying the speed of said variable speed motor responsive to signals from said condition responsive device.

10. The apparatus as set forth in claim 8 further comprising:

a second condition responsive device sensing a space between said articles carried on said outfeed conveyor and generating a back-up signal when there is no space between said articles and feeding said back-up signal to said variable speed motor to stop said outfeed conveyor.

11. The apparatus as set forth in claim 8 further comprising:

a condition responsive device generating infeed back-up signals when there is a back-up of articles on said infeed conveyor and for adjusting the flow of articles from said main conveyor onto said infeed conveyor.

12. An apparatus for controlling the flow of articles comprising:

an infeed conveyor for transporting said articles;

an outfeed conveyor;

a support structure supporting said infeed conveyor and said outfeed conveyor wherein a substantial portion of the run of said conveyors are parallel to each other providing a space therebetween;

a transport member carried by said support structure in said space between said infeed and outfeed conveyors;

infeed drive mechanism driving said infeed conveyor in one direction;

outfeed drive mechanism driving said outfeed conveyor in a second direction;

a variable speed control operatively connected to said outfeed drive mechanism for varying the speed of said outfeed conveyor;

a rotatable member carried by said transport member;

drivers carried by said infeed conveyor engaging said rotatable member for rotating said rotatable member;

drivers carried by said outfeed conveyor engaging said rotatable member for rotating said rotatable member and causing said transport member to move along a path parallel to said infeed conveyor and said outfeed conveyor at a speed and direction depending on the relative speed of said infeed conveyor and said outfeed conveyor;

an article deflecting member carried by said transport member for deflecting articles from said infeed conveyor to said outfeed conveyor;

a main conveyor for feeding articles onto said infeed conveyor;

a main conveyor drive mechanism driving said main conveyor at a first speed; and said infeed drive mechanism driving said infeed conveyor at a slower speed than said first speed so that said articles are spaced closer together on said infeed conveyor than on said main conveyor after said articles are fed from said main conveyor onto said infeed conveyor.

13. The apparatus as set forth in claim 12 wherein said article deflecting member is a plurality of article gripping members that are moved by said rotatable member to grip said articles on said infeed conveyor and transfer said articles to said outfeed conveyor.

14. An apparatus for controlling the flow of articles comprising:

an infeed conveyor for transporting said articles;

a main conveyor feeding articles to said infeed conveyor;

an outfeed conveyor;

a support structure supporting said infeed conveyor and said outfeed conveyor wherein a substantial portion of the run of said conveyors are parallel to each other providing a space therebetween;

said support structure supports said infeed and outfeed conveyors with a substantial portion of the run of said conveyors being in a vertically extending spiral made up of vertically spaced layers;

a transport member carried by said support structure in said space between said infeed and outfeed conveyors;

infeed drive mechanism driving said infeed conveyor in one direction;

outfeed drive mechanism driving said outfeed conveyor in a second direction;

a rotatable member carried by said transport member;

drivers carried by said infeed conveyor engaging said rotatable member for rotating said rotatable member;

drivers carried by said outfeed conveyor engaging said rotatable member for rotating said rotatable member and causing said transport member to move along a path parallel to said infeed conveyor and said outfeed conveyor at a speed and direction depending on the relative speed of said infeed conveyor and said outfeed conveyor; and an article deflecting member carried by said transport member for deflecting articles from said infeed conveyor to said outfeed conveyor.

15. An apparatus for controlling the flow of articles comprising:

an infeed conveyor for transporting said articles;

an outfeed conveyor;

a support structure supporting said infeed conveyor and said outfeed conveyor wherein a substantial portion of the run of said conveyors are parallel to each other providing a space therebetween;

a transport member carried by said support structure in said space between said infeed and outfeed conveyors;

infeed drive mechanism driving said infeed conveyor in one direction;

outfeed drive mechanism driving said outfeed conveyor in a second direction;

a variable speed control operatively connected to said outfeed drive mechanism for varying the speed of said outfeed conveyor;

a rotatable member carried by said transport member;

drivers carried by said infeed conveyor engaging said rotatable member for rotating said rotatable member;

drivers carried by said outfeed conveyor engaging said rotatable member for rotating said rotatable member and causing said transport member to move along a path parallel to said infeed conveyor and said outfeed conveyor at a speed and direction depending on the relative speed of said infeed conveyor and said outfeed conveyor;

an article deflecting member carried by said transport member for deflecting articles from said infeed conveyor to said outfeed conveyor;

said drivers carried by said outfeed conveyor including driving lugs equally spaced along said outfeed conveyor; and said rotatable member having sockets meshing with said driving lugs providing a driving coupling between said rotatable member and said outfeed conveyor.

16. The apparatus as set forth in claim 15 wherein said article deflecting member includes:

an arcuately shaped deflector plate having one end extending over the run of said infeed conveyor and another end extending over the run of said outfeed conveyor for deflecting articles from said infeed conveyor to said outfeed conveyor.

17. The apparatus as set forth in claim 16 further comprising:

a vertically extending axle carried by said transport member upon which said rotatable member is carried;

a wheel fixed to said rotatable member having a rim spaced from said arcuately shaped deflector plate providing a path through which spaced articles are deflected from said infeed conveyor to said outfeed conveyor.

18. An apparatus for controlling the flow of articles from an upstream delivery station to a downstream receiving station according to the capacity of said downstream receiving station comprising:

an endless infeed conveyor;

an endless outfeed conveyor;

a support structure supporting said infeed conveyor and said outfeed conveyor wherein a substantial portion of the run of said conveyors are parallel to each other providing a space therebetween;

a track carried by said support structure, said track extending along a substantial portion of said parallel run of said infeed and outfeed conveyors;

a transport member carried by said track in said space between said infeed and outfeed conveyors for movement along the length of said infeed and outfeed conveyors;

infeed drive mechanism driving said infeed conveyor in one direction;

outfeed drive mechanism driving said outfeed conveyor in a second direction;

a rotatable member carried by said transport member;

a driving coupling provided between said infeed conveyor and said rotatable member through which said infeed conveyor rotates said rotatable member;

a driving coupling provided between said rotatable member and said outfeed conveyor for rotating said rotatable member and causing said transport member to move along said guide track in a direction depending on the relative speed of travel of said infeed and outfeed conveyors; and an article transfer member carried by said transport member for transferring articles from said infeed conveyor to position along said outfeed conveyor as said transport member moves along said guide track;

said article transport member includes a circular plate having a diameter sufficient to allow said circular plate to extend over said infeed conveyor and said outfeed conveyor; and a driving connection between said rotatable member and said circular plate for rotating said circular plate to transfer articles moving on said infeed conveyor onto one side of said circular plate to said outfeed conveyor.

19. An apparatus for controlling the flow of articles comprising:

an endless infeed conveyor for transporting said articles;

an endless outfeed conveyor;

a support structure supporting said infeed conveyor and said outfeed conveyor wherein a substantial portion of the run of said conveyors are parallel to each other providing a space therebetween;

said support structure supporting said infeed and outfeed conveyors with a substantial run of said conveyors being in a vertically extending spiral made up of vertically spaced layers;

a transport member carried by said support structure in said space between said infeed and outfeed conveyors;

infeed drive mechanism driving said infeed conveyor in one direction;

outfeed drive mechanism driving said outfeed conveyor in a second direction;

said infeed drive mechanism having direct drive connection to at least a plurality of said layers of infeed conveyor;

said outfeed drive mechanism having a direct drive connection to at least a plurality of said layers of said outfeed conveyor;

a rotatable member carried by said transport member;

drivers carried by said infeed conveyor engaging said rotatable member for rotating said rotatable member;

drivers carried by said outfeed conveyor engaging said rotatable member for rotating said rotatable member and causing said transport member to move along a path parallel to said infeed conveyor and said outfeed conveyor at a speed and direction depending on the relative speed of said infeed conveyor and said outfeed conveyor; and an article deflecting member carried by said transport member for deflecting articles from said infeed conveyor to said outfeed conveyor.

* * * * *